US010437282B2

(12) United States Patent
Kenney et al.

(10) Patent No.: US 10,437,282 B2
(45) Date of Patent: Oct. 8, 2019

(54) ELECTRONIC DEVICE WITH COMPOSITE DISPLAY HOUSING

(71) Applicant: Apple Inc., Cupertino, CA (US)

(72) Inventors: Kevin M. Kenney, San Jose, CA (US); Nicholas A. Rundle, San Jose, CA (US); Adam T. Garelli, Santa Clara, CA (US); Sarah J. Montplaisir, Pacifica, CA (US); Matthew W. Crowley, San Francisco, CA (US); Dinesh C. Mathew, Fremont, CA (US)

(73) Assignee: Apple Inc., Cupertino, CA (US)

( * ) Notice: Subject to any disclaimer, the term of this patent is extended or adjusted under 35 U.S.C. 154(b) by 623 days.

(21) Appl. No.: 15/028,847

(22) PCT Filed: Oct. 23, 2013

(86) PCT No.: PCT/US2013/066406
§ 371 (c)(1),
(2) Date: Apr. 12, 2016

(87) PCT Pub. No.: WO2015/060843
PCT Pub. Date: Apr. 30, 2015

(65) Prior Publication Data
US 2016/0259366 A1 Sep. 8, 2016

(51) Int. Cl.
*G06F 1/16* (2006.01)
*G06F 1/20* (2006.01)
*H04N 5/64* (2006.01)

(52) U.S. Cl.
CPC .............. *G06F 1/1601* (2013.01); *G06F 1/20* (2013.01); *G06F 1/203* (2013.01); *H04N 5/64* (2013.01)

(58) Field of Classification Search
CPC .... G06F 1/1601; G06F 1/1616; G06F 1/1637; G06F 1/181; G06F 1/203; H05K 5/02;
(Continued)

(56) References Cited

U.S. PATENT DOCUMENTS 4,420,450 A * 12/1983 Marsh .................... B26D 7/08
264/118
5,628,031 A * 5/1997 Kikinis ................. G06F 1/1626
345/173
(Continued)

FOREIGN PATENT DOCUMENTS

EP          1785970          5/2007

*Primary Examiner* — Dimary S Lopez Cruz
*Assistant Examiner* — Ingrid D Wright
(74) *Attorney, Agent, or Firm* — Treyz Law Group, P.C.; G. Victor Treyz; David K. Cole

(57) ABSTRACT

An electronic device may be provided with a display. The display may be mounted in a display housing having multiple display housing layers. The display housing layers may include metal layers and fiber composite layers. A fiber composite display housing layer may have an array of dimples. The fiber composite display housing layer may be attached to a planar metal layer using adhesive. An array of openings may be formed in the metal layer to lighten the display housing. A foam layer or other core may be sandwiched between display housing layers. Components may be embedded in the foam. Edge members may run along peripheral edges of the display housing layers. Electrical components may be mounted on printed circuits and housed within cavities in the display housing. The electrical components may include light-emitting diodes for a display. Heat from the electrical components may be dissipated in the metal layer.

39 Claims, 39 Drawing Sheets

(58) Field of Classification Search
CPC ..... H05K 2201/10128; H05K 7/20963; H04N 5/64
See application file for complete search history.

(56) References Cited

U.S. PATENT DOCUMENTS

| | | | |
|---|---|---|---|
| 5,666,261 A | 9/1997 | Aguilera | |
| 6,262,887 B1* | 7/2001 | Lee | G06F 1/1616 361/679.27 |
| 7,030,546 B2* | 4/2006 | Han | G02F 1/133604 313/402 |
| 8,350,980 B2* | 1/2013 | Ohashi | G02B 6/0085 349/58 |
| 8,879,249 B1* | 11/2014 | Wanderman | G06F 1/1601 29/592.1 |
| 2007/0228917 A1* | 10/2007 | Koiwa | H05K 5/02 313/238 |
| 2008/0101639 A1* | 5/2008 | Eaton | H04M 1/03 381/334 |
| 2008/0284940 A1* | 11/2008 | Choi | G02F 1/133308 349/60 |
| 2011/0290685 A1* | 12/2011 | Kenney | G06F 1/1656 206/320 |
| 2012/0050975 A1 | 3/2012 | Garelli | |
| 2014/0042293 A1* | 2/2014 | Mok | G06F 1/1652 248/682 |
| 2016/0236445 A1* | 8/2016 | Kang | B32B 15/14 |
| 2016/0377795 A1* | 12/2016 | Sundaram | G02B 6/0055 345/690 |

* cited by examiner

ELECTRONIC DEVICE WITH COMPOSITE DISPLAY HOUSING

BACKGROUND

This relates generally to electronic devices and, more particularly, to electronic devices with displays.

Electronic devices often include displays. For example, cellular telephones, computers, and televisions have displays.

It can be challenging to form displays with desired attributes. Some displays are too thick or are mounted in display housings that are too large. Other displays may be poorly integrated with electronic device components, leading to bulky designs that are not aesthetically appealing.

It would therefore be desirable to be able to provide electronic devices with improved display housings.

SUMMARY

An electronic device may be provided with a display. The display may be mounted in a display housing having multiple display housing layers. The display housing layers may include metal layers and fiber composite layers. A fiber composite display housing layer may have an array of dimples. The fiber composite display housing layer may be attached to a planar display housing layer such as a fiber composite layer or metal layer using adhesive. An array of openings may be formed in the planar display housing. For example, an array of diamond shaped openings may be formed in a planar metal layer to lighten the display housing.

A core layer may be sandwiched between the display housing layers in the display housing. The core layer may be formed from polymer foam, a solid poured in plastic resin, honeycomb material (e.g., honeycomb aramid or other honeycomb structure), expanded foamed aluminum or other foamed metal, or other materials. The core layer may be incorporated into the display housing during molding operations. Components such as electrical components on printed circuits, mechanical components such as screws, components for facilitating the formation of electrical paths such as hollow tubing, wires, and other structures may be embedded within the foam and housed within gaps between the layers of the display housing.

An edge member may run along peripheral edges of the display housing layers. The edge member may have portions that are sandwiched between the display housing display layers and that are attached to the display housing layers with adhesive. The edge member may be formed from metal or plastic and may be formed from one or more segments.

Heat may be dissipated in a metal display housing layer. A heat spreader or other heat sink structure may be used to help dissipate heat. The heat sink structure may be mounted adjacent to an electrical component that is generating heat or a metal display housing layer may be interposed between the electrical component that is generating heat and the heat sink structure.

The display layers may have portions that form screw bosses and other integral features. A stand for an electrical device may be formed using an integral extending portion of one of the display housing layers in a display housing. A mounting bracket may be formed from a portion of a display layer or may be attached to one of the display layers in a display housing in a location such as a depression formed in a fiber composite display layer.

Fiber composite display housing layers may be molded into a desired shape using a heated mold. The fiber composite display housing layers may be formed from a thermoplastic material containing carbon fibers or other fibers.

DETAILED DESCRIPTION

Electronic devices may be provided with displays. The displays may be mounted in display housings. The display housings may form all or part of the housings of the electronic devices. Layers in the display housings may be attached using adhesive, welds, fasteners, and other attachment mechanisms. Fiber composite materials such as carbon fiber composites, fiberglass, and other materials may be used in forming one or more layers in a display housing. Fiber composite materials may have fibers that are embedded in a binder such as a thermoplastic or thermoset plastic (i.e., a polymer, sometimes referred to as a resin). Molding, machining, stamping, laser cutting, and other fabrication techniques may be used in shaping the fiber composite materials. Layers of other materials such as layers of metal may also be used in forming a display housing.

Illustrative electronic devices that have housings that accommodate displays are shown in FIGS. 1, 2, 3, and 4.

Figure 1:
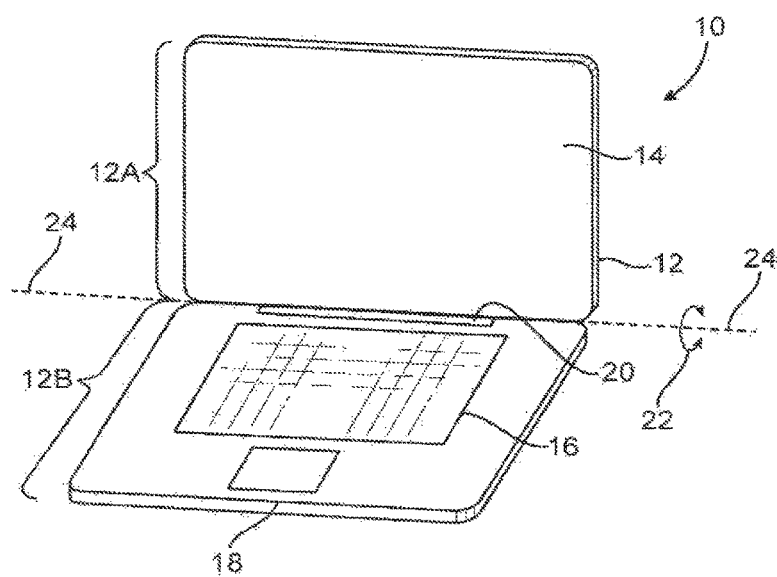
FIG. 1 is a perspective view of an illustrative electronic device such as a laptop computer with display housing structures in accordance with an embodiment.

Electronic device 10 of FIG. 1 has the shape of a laptop computer and has upper housing 12A and lower housing 12B with components such as keyboard 16 and touchpad 18. Device 10 has hinge structures 20 (sometimes referred to as a clutch barrel) to allow upper housing 12A to rotate in directions 22 about rotational axis 24 relative to lower housing 12B. Display 14 is mounted in housing 12A. Upper housing 12A, which may sometimes referred to as a display housing or lid, is placed in a closed position by rotating upper housing 12A towards lower housing 12B about rotational axis 24.

Figure 2:
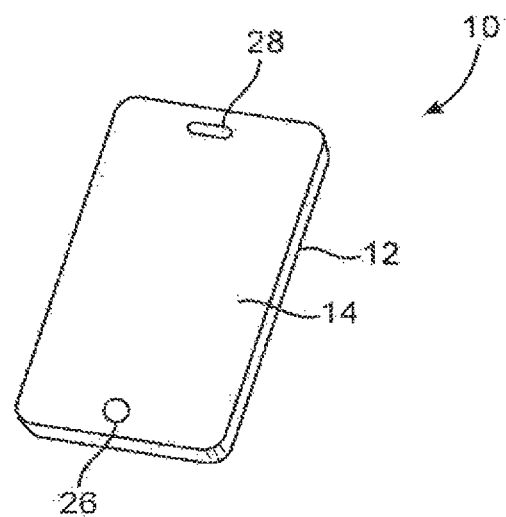
FIG. 2 is a perspective view of an illustrative electronic device such as a handheld electronic device with display housing structures in accordance with an embodiment.

FIG. 2 shows an illustrative configuration for electronic device 10 based on a handheld device such as a cellular telephone, music player, gaming device, navigation unit, or other compact device. In this type of configuration for device 10, housing 12 has opposing front and rear surfaces. Display 14 is mounted on a front face of housing 12. Display 14 may have an exterior layer that includes openings for components such as button 26 and speaker port 28.

Figure 3:
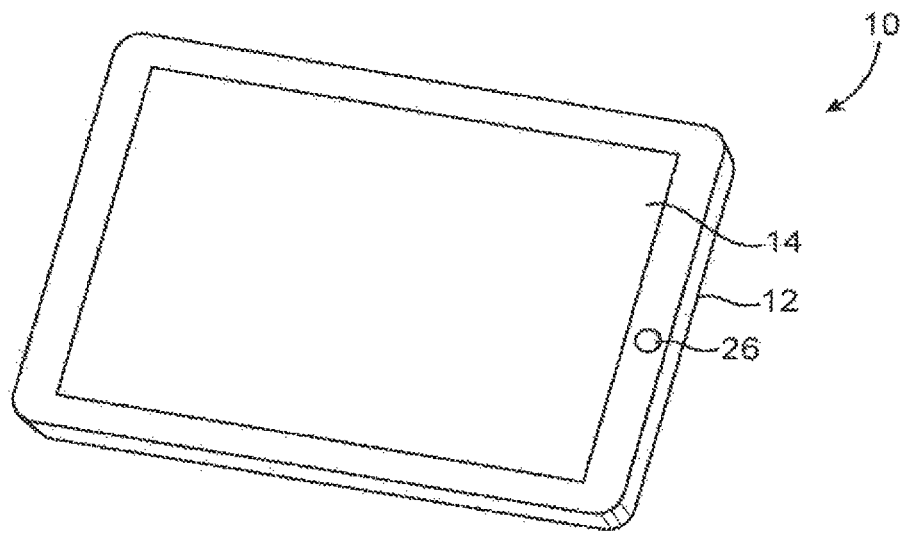
FIG. 3 is a perspective view of an illustrative electronic device such as a tablet computer with display housing structures in accordance with an embodiment.

In the example of FIG. 3, electronic device 10 is a tablet computer. In electronic device 10 of FIG. 3, housing 12 has opposing planar front and rear surfaces. Display 14 is mounted on the front surface of housing 12. As shown in FIG. 3, display 14 has an external layer with an opening to accommodate button 26.

Figure 4:
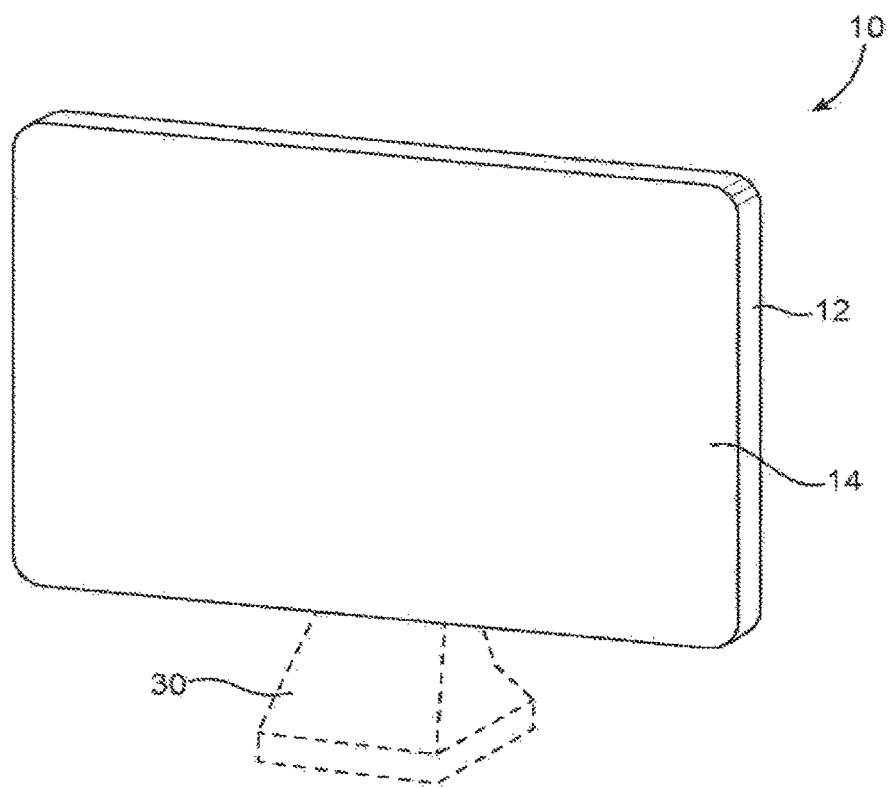
FIG. 4 is a perspective view of an illustrative electronic device such as a display for a computer or television with display housing structures in accordance with an embodiment.

FIG. 4 shows an illustrative configuration for electronic device 10 in which device 10 is a computer display, a computer that has an integrated computer display, or a television. Display 14 is mounted on a front face of housing 12. With this type of arrangement, housing 12 for device 10 may be mounted on a wall or may have an optional structure such as support stand 30 to support device 10 on a flat surface such as a table top or desk.

In devices such as devices 10 of FIGS. 1, 2, 3, and 4, housing 12 receives display 14 and therefore serves as a display housing for display 14. To enhance device aesthetics and performance, it may be desirable to form some of the display housing of device 10 (e.g., housing 12 of FIGS. 1, 2, 3, and 4) from fiber composites, metal, and/or material that is sandwiched together between layers of fiber composite material and/or metal to form thin, stiff, and lightweight structures of the type that can be used to support flat panel displays. By forming sandwiches of appropriate materials, weight can be minimized, stiffness can be enhanced, and internal structures such as embedded components can be accommodated.

Figure 5:
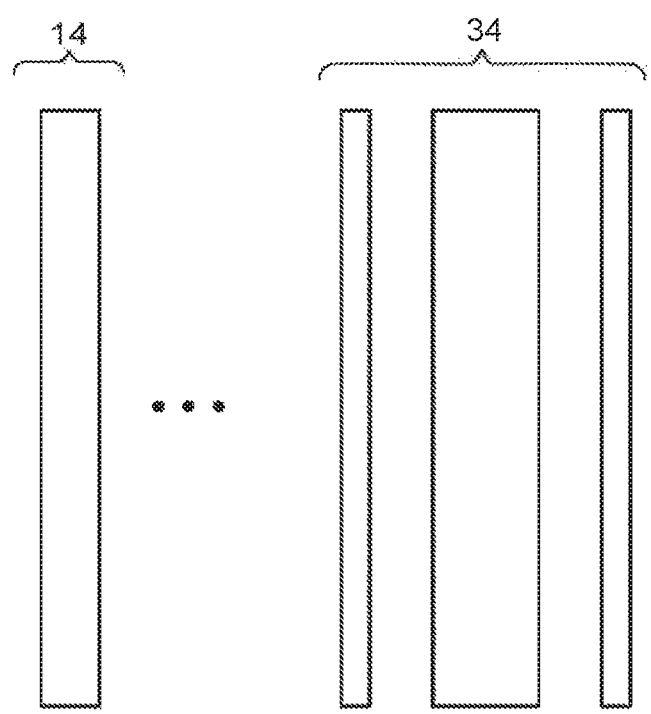
FIG. 5 is a cross-sectional side view of structures associated with providing a display in a display housing for an electronic device in accordance with an embodiment.

FIG. 5 is a cross-sectional side view of structures associated with supporting and housing a display in electronic device 10. As shown in FIG. 5, display 14 may be mounted to display housing structures such as display housing layers 34. Display 14 may be a liquid crystal display, an organic light-emitting diode display, a plasma display, an electrophoretic display, a display that is insensitive to touch, a touch sensitive display that incorporates and array of capacitive touch sensor electrodes or other touch sensor structures, or may be any other type of suitable display.

Display housing layers 34 may include layers that are formed from carbon-fiber composite material, fiberglass composite material, or other fiber composites, metal, plastic, glass, ceramic, or other materials. Display housing layers 34 may be attached to one another using layers of adhesive (e.g., pressure sensitive adhesive, liquid adhesive, etc.), fasteners such as screws, engagement features (e.g., clips and springs, etc.), magnets, or other suitable attachment mechanisms.

In some configurations, display housing layers 34 use a sandwich construction to form relatively thin and rigid structures for supporting display 14. With this type of configuration, layers 34 may include, for example, one or more planar layers of metal, plastic, fiber composite, glass, ceramic, paper, or combinations of these materials, one or more layers of these materials with dimples or other depressions (e.g., layers with an array of depressions or other indentations for enhancing stiffness), and one or more core layers (e.g., foam such as injection molded foam, honeycomb structures, etc.). Fabrication techniques such as machining, stamping, cutting, molding, injection molding, laminating, and other fabrication techniques may be used in forming a display housing from layers 34 to house display 14 in device 10. In some of these techniques, sandwich structures are formed in which one more layers are attached to one another to form a display housing.

Figure 6:
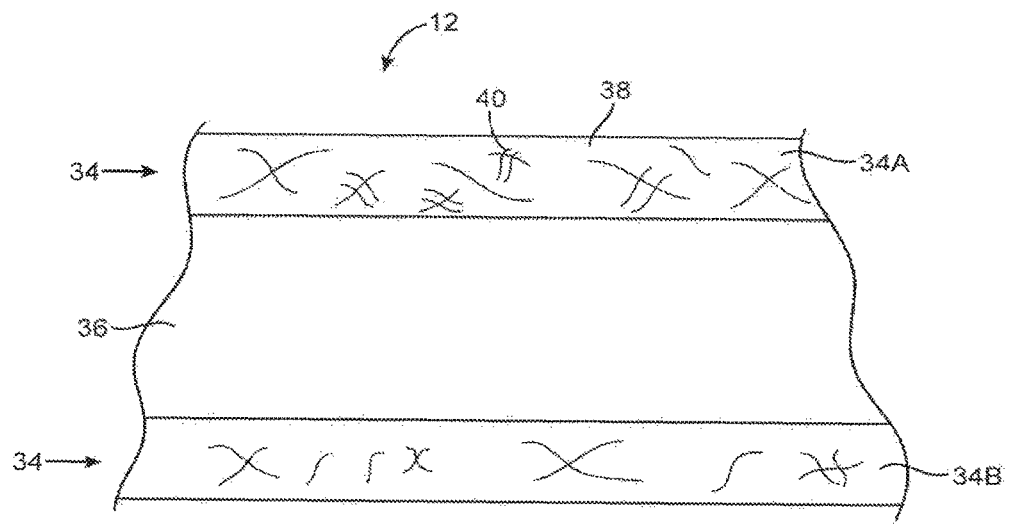
FIG. 6 is a cross-sectional side view of a pair of composite layers that may be used in forming a display housing in accordance with an embodiment.

FIG. 6 is a cross-sectional side view of an illustrative sandwich structure for a display housing in device 10. As shown in FIG. 6, display housing 12 may include core layer 36 sandwiched between layers 34. Layers 34 may be, for example, fiber composite layers having fibers 40 embedded in binder 38. Fibers 40 may be carbon fibers, glass fibers, or other types of fiber. Binder 38 may be a polymer such as a thermoset plastic or a thermoplastic plastic. Layers 34 may be shaped into a desired shape by application of heat and pressure in a heated mold or may be machined or otherwise shaped into a desired configuration. Core material 36 may be foam (e.g., plastic foam), honeycomb material, or other material. If desired, air may fill some or all of the spaces between layers 34 (i.e., layers 34 may enclose air-filled cavities in display housing 12). In a typical configuration, one of layers 34 (e.g., layer 34A) may serve as a mounting layer for display 14 (sometimes referred to as a front layer or inner layer) and another of layers 34 (e.g., layer 34B) may serve as a cosmetic surface (sometimes referred to as a rear layer or outer layer).

Figure 7:
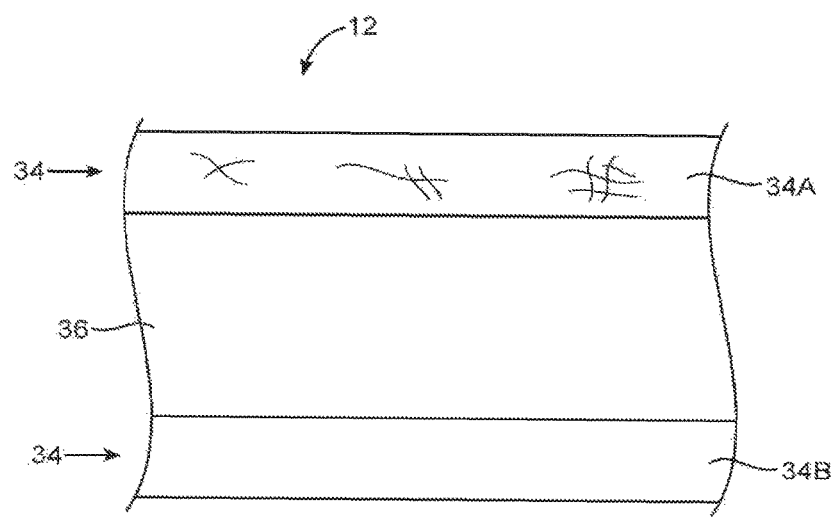
FIG. 7 is a cross-sectional side view of illustrative layers of material including a composite layer that may be used in forming a display housing in accordance with an embodiment.

FIG. 7 is a cross-sectional side view of display housing 12 in an illustrative configuration in which front layer 34A has been formed from fiber composite material and rear layer 34B has been formed from a different type of material (e.g., plastic, glass, metal, multiple sandwiched layers, etc.)

Figure 8:
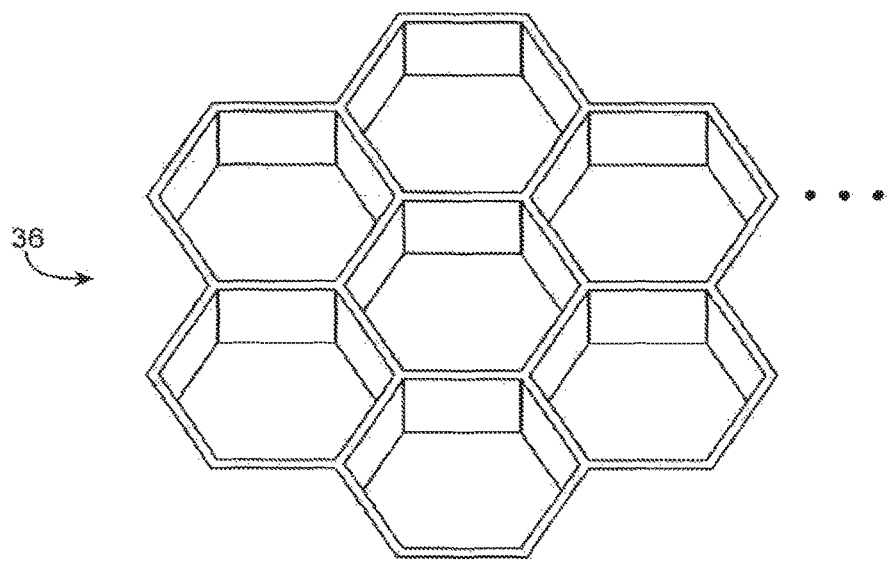
FIG. 8 is a perspective view of a honeycomb structure that may be used as part of a display housing in accordance with an embodiment.

FIG. 8 is a perspective view of a honeycomb structure that may be used as part of display housing. The structure of FIG. 8 may, for example, be used in forming core 36.

Figure 9:
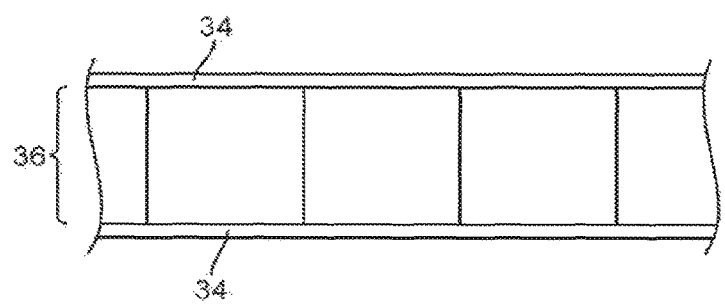
FIG. 9 is a cross-sectional side view of an illustrative display housing structure having a core layer such as a core layer formed from a honeycomb structure in accordance with an embodiment.

FIG. 9 is a cross-sectional side view of an illustrative display housing structure with a core such as honeycomb structure 36 of FIG. 8 sandwiched between respective display housing layers 34.

Figure 10:
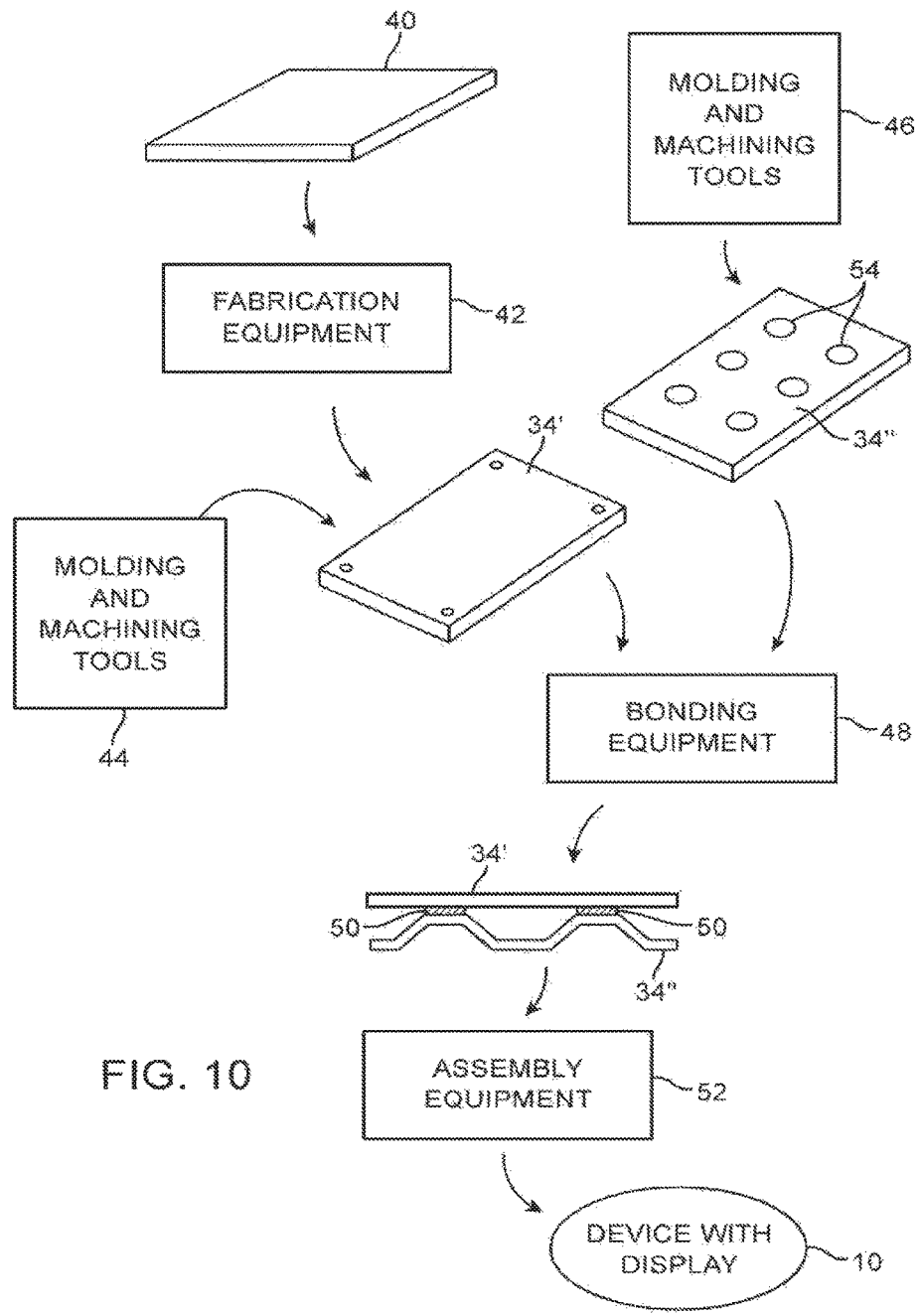
FIG. 10 is a diagram showing how display housing structures may be formed in accordance with an embodiment.

Display housing 12 may be formed using equipment of the type shown in FIG. 10. Initially, layer 40 may be processed using fabrication equipment 42 to form display housing layer 34'. Layer 40 may, for example, be formed from metal, glass, plastic, ceramic, fiber composite material, etc. Fabrication equipment 42 may include machining equipment, cutting equipment (e.g., equipment that includes a blade, a rotating cutting head, water-jet cutting equipment, a laser cutting head, etc.), stamping equipment (e.g., a die for stamping metal or plastic sheets into a desired shape), or other equipment for processing layer 40 to produce a desired shape for display housing layer 34'. If desired, layer 32' may be formed using molding equipment and machining tools 44. For example, layer 32' may be formed from a layer of plastic or fiber composite material containing a thermoplastic binder material that is molded to a desired shape using a heated die. Optional cutting, machining, and other fabrication operations may be performed on the molded layer to form display housing layer 34'.

Equipment such as molding and machining equipment 46 may likewise be used in forming one or more display housing layers such as layer 34". Layers 34' and/or 34" may have dimples or other depressions or surface features (see, e.g., depressions 54, which may sometimes be referred to as protrusions, indentations, or cavities).

Bonding equipment 48 may attach layers 34' and 34" together using connections 50. Bonding equipment 48 may include equipment for dispensing a sheet of pressure sensitive adhesive, liquid adhesive, solder, fasteners, or other material. Equipment 48 may form welds or other connections structures if desired. Connections 50 may be adhesive, solder, welds, screws or other fasteners, etc.

Assembly equipment 52 may be used to mount display 14 within display housing 12 and to complete assembly of device 10. Equipment 52 may perform these assembly operations using adhesive, fasteners, and other attachment structures.

Figure 11:
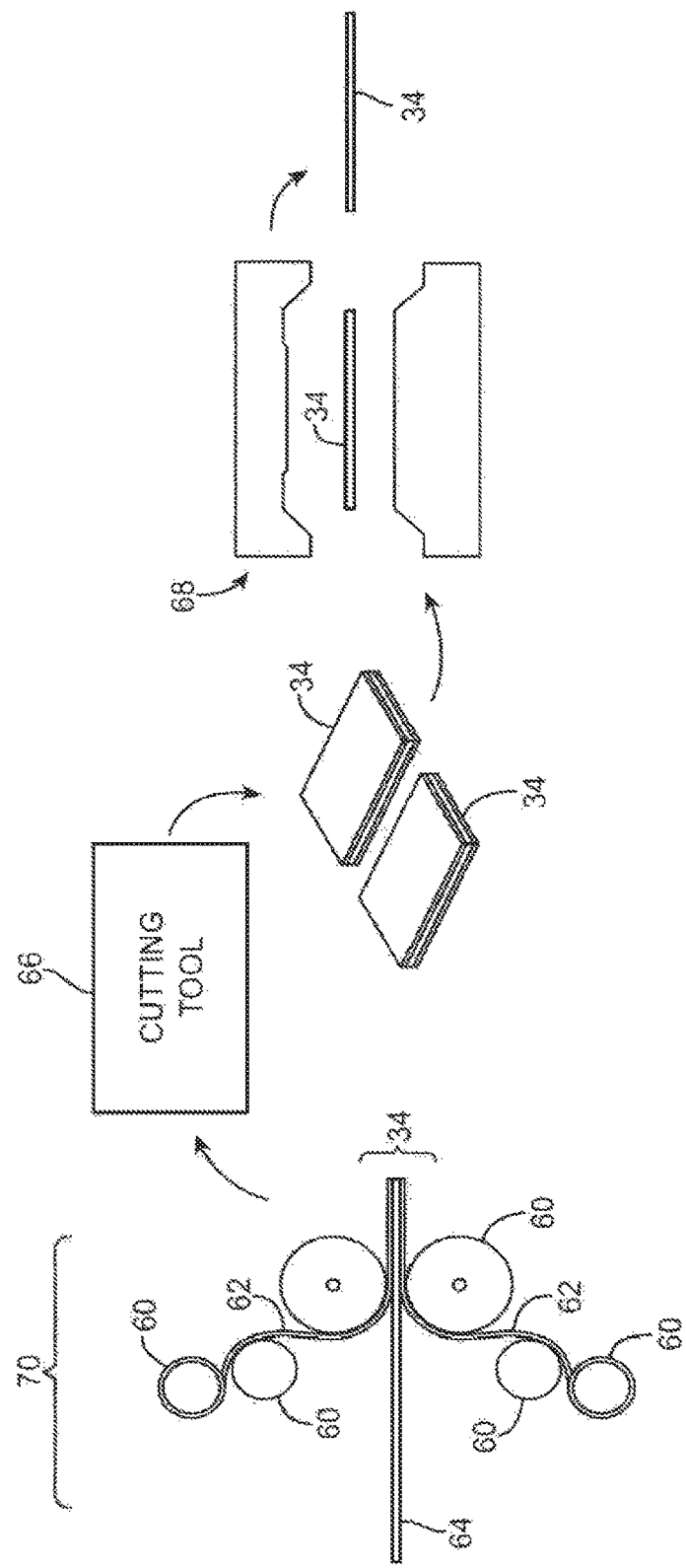
FIG. 11 is a diagram of a system that uses rollers to form display housing structures in accordance with an embodiment.

In the illustrative example of FIG. 11, roll feeder equipment 70 uses rollers 60 to create a sandwich of layers 62 and 64. Layer 64 may be, for example, a core layer of foam or honeycomb material (as an example). Layers 62 may be fiber composite layers such as carbon fiber composite layers or layers of fiberglass (as an example). Thin metal layers may also be used for layers 62. Cutting tool 66 may cut the layer of sandwiched material 34 that is produced by equipment 70 into individual panels. Robotic equipment that is associated with tool 66 may help transfer the cut panels of material from system 70 to heated mold (press) 68. If desired, layers 34 may be preheated to facilitate molding in tool 68. Tool 68 may be a low pressure tool that deforms foam layer 64 while molding heated composite layers 62 (e.g., while heating and molding thermoplastic material in layers 62) into a desired shape. The shape in which tool 68 deforms layers 62 may have an array of depressions 54 to help strengthen display housing 12.

Figure 12:
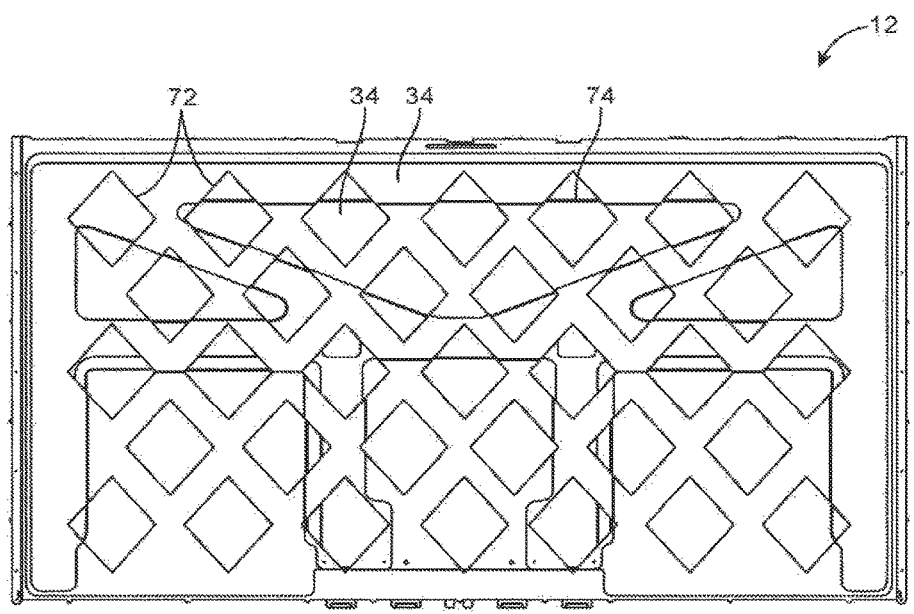
FIG. 12 is a top view of a display housing structure having a molded composite structure and a stamped metal layer with openings in accordance with an embodiment.

If desired, display housing 12 may be formed from a metal layer or other layer 34 with openings. This type of configuration is shown in FIG. 12. As shown in FIG. 12, display housing 12 may include two layers 34. One layer may be a metal layer with a two-dimensional array of diamond-shaped holes or other openings 72. The array of openings 72 may have any suitable number of rows and columns (e.g., two or more, five or more, ten or more, etc.). The use of openings 72 may accommodate components and wiring in display housing 12 and/or may reduce the weight associated with display housing 12.

A metal layer that is used as a display housing layer in display housing 12 may serve as a heat sink and ground plane for display housing 12. Non-metal layers in display housing 12 may be formed from molded composite material and may have integral features such as recesses 74 (sometimes referred to as depressions, indentations, etc.). Recesses 74 may be configured to receive electrical components and other device structures. The use of composite material for one of the layers 34 of display housing 12 may help provide display housing 12 with stiffness, strength, and the ability to provide recesses and other features of desired shapes. If desired, the layer of display housing 12 that includes the recesses and other features may be a metal layer and the layer of display housing 12 that provides strength may be a planar composite layer. Combinations of these types of arrangements and display housing configurations with three or more display housing layers may also be used.

Figure 13:
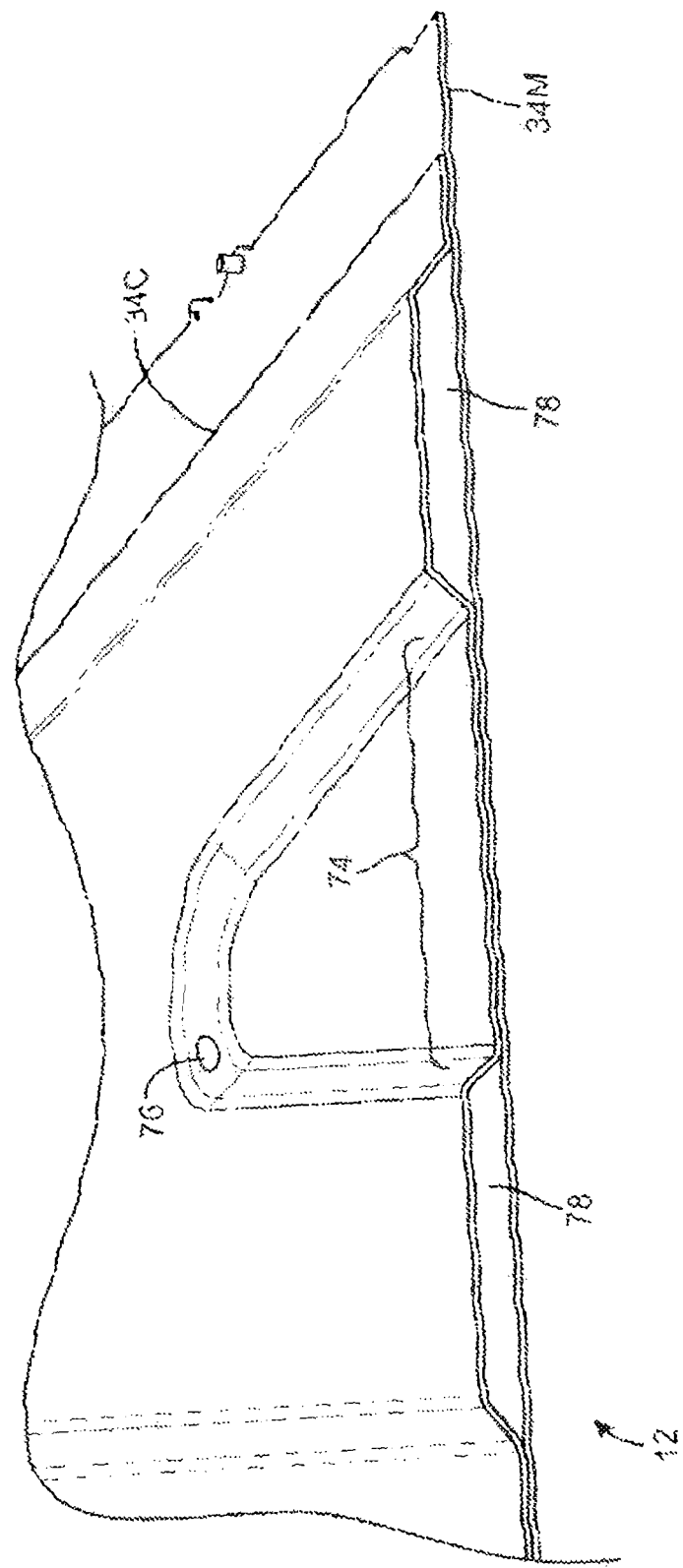
FIG. 13 is a cross-sectional perspective view of a portion of a display housing having a molded composite layer with depressions and having a planar layer of material that is attached to the molded composite layer in accordance with an embodiment.

FIG. 13 is a perspective view of an illustrative configuration that may be used for display housing 12. Display housing 12 may include metal layer 34M and composite layer 34C. Recesses 74 may be used to accommodate components and other structures in display housing 12. In some embodiments (e.g., scenarios in which recesses 74 form an array of dimples), the shapes of the depressions formed from recesses 74 may provide additional strength to housing 12 by making the display layer less flexible and enhancing torsional rigidity. Additional strength may be provided by filling the cavities between layer 34C and layer 34M with foam 78 or other strengthening core material. Openings such as opening 76 may be formed in layer 34C to accommodate wiring and other structures in device 10 (e.g., to accommodate cables or other wires that extend between recess 74 and components embedded within foam 78).

The edges of display housing 12 may be provided with strips of metal, plastic, or other protective edge members. These edge member(s), which may sometimes be referred to as band structures or a housing band, may be formed in segments (e.g., four elongated segments that extend along each of the four sides of display housing 12 in a configuration in which display housing 12 has a rectangular footprint to accommodate a rectangular display) or may be formed in other shapes (e.g., a unitary rectangular ring having a rectangular opening to receive layers 34), etc.

Figure 14:
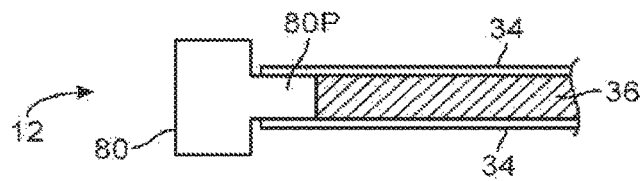
FIGS. 14, 15, 16, 17, 18, and 19 are cross-sectional side views of edge portions of a display housing in accordance with an embodiment.

In the illustrative cross-sectional side view of the edge portions of display housing 12 of FIG. 14, inwardly directed edge member protrusion 80P of edge member 80 is attached (sandwiched) between respective layers 34. Layers 34 may be separated by a layer of core material such as core material 36 (e.g., foam, etc.).

Figure 15:
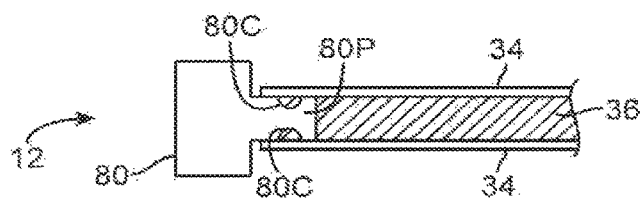

In the configuration of FIG. 15, protrusion 80P of edge member 80 has channels 80C to provide a mechanical locking feature that helps retain edge member within display housing 12.

Figure 16:
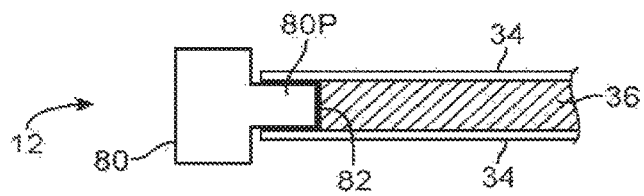

In the example of FIG. 16, low durometer elastomeric gasket 82 is used to allow for expansion and contraction of the structures of FIG. 16 due to changes in temperature. The configuration of FIG. 16 can accommodate mismatches in the coefficient of thermal expansion between the materials in different display layers 34.

Figure 17:
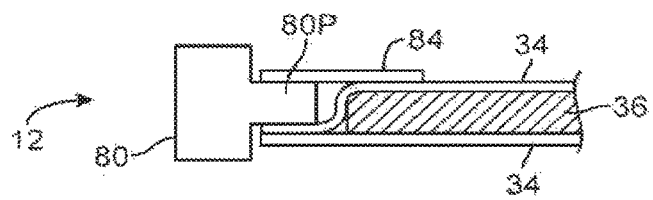

FIG. 17 shows how one of layers 34 may be folded downwards to meet the other of layers 34 and how an attachment structure such as strip 84 may help attach protrusion 80P of edge member 80 to layers 34 of display housing 12. This design allows for separation of edge member 80 from layers 34. Strip 84 may be attached using adhesive or other attachment mechanisms (e.g., strip 84 may be attached after attaching member 80 to the display housing). Strip 84 may be formed from fiber composite material or other materials (e.g., plastic, metal, etc.).

Figure 18:
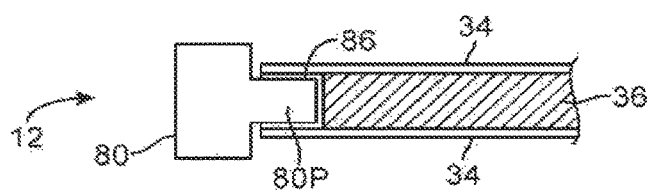

FIG. 18 is a cross-sectional side view of an edge portion of illustrative display housing structures 12 in which a C-shaped closeout (structure 86) allows for attachment of edge member 80 after forming an initial subassembly by sandwiching foam layer 36 between layers 34. Initially, structure 86 is mounted along the edge of layers 34 and 36. After successful attachment of structure 86, edge member 80 may be added to display housing 12 by inserting protrusion 80P into the opening formed by C-shaped structure 86. The use of a closeout structure such as illustrative closeout structure 86 may help form a seal that isolates foam 36 from the ambient environment. Foam 36 may be a hydrophilic foams such as expanded polyurethane, so environmental sealing may help form an air barrier that prevents moisture from infiltrating foam 36.

Figure 19:
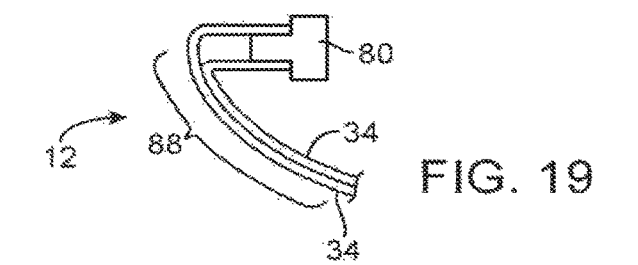

As shown in FIG. 19, the edge of display housing 12 may be folded back on itself to form a curved outer surface such as curved surface 88 (e.g., to allow for a rear cover composite design).

Figure 20:
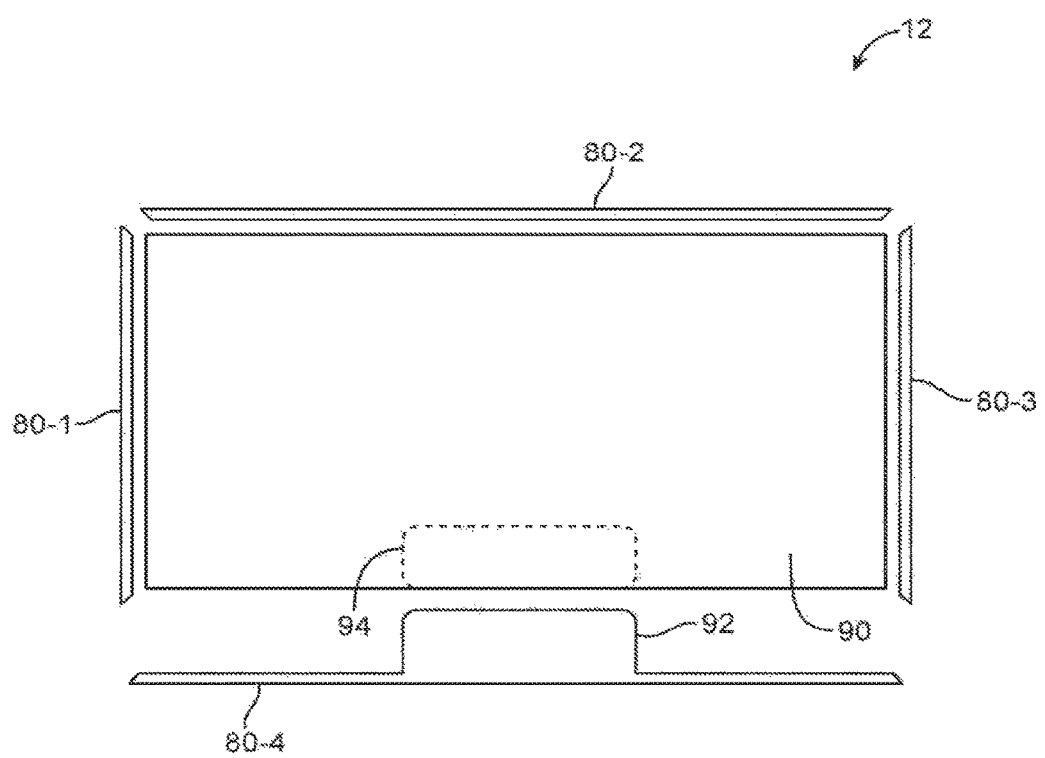
FIG. 20 is a diagram of an illustrative electronic device with display housing structures in accordance with an embodiment.

FIG. 20 is a diagram of illustrative display housing structures 12 formed by attaching four respective edge member segments 80-1, 80-2, 80-3, and 80-4 to planar housing structure 90. Structure 90 may be formed by sandwiching core 36 between layers 34 and providing an edge structure of the type shown in the examples of FIGS. 14, 15, 16, 17, 18, and 19 (as examples). Lower edge member segment 80-4 may have a protrusion such as tab (tongue) 92 that is received within edge recess 94 of panel 90 (e.g., to provide additional strength to member 80-4 to facilitate integration with a hinge, stand, or other housing structures). Edge members 80 (e.g., segments 80-1, 80-2, 80-3, and 80-4 in the example of FIG. 20) may be formed from a metal such as stainless steel or aluminum, from plastic, or from other materials.

Figure 21:
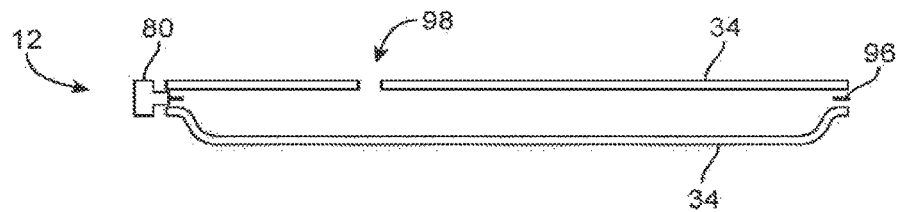
FIG. 21 is a cross-sectional side view of display housing structures that are being attached to each other to form a display housing in accordance with an embodiment.
Figure 22:
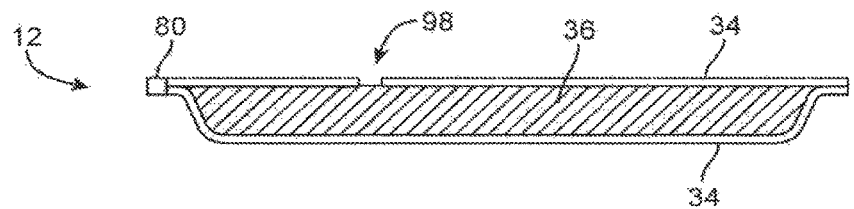
FIG. 22 is a cross-sectional side view of the display housing structures of FIG. 21 in which internal cavities have been filled with a core material in accordance with an embodiment.

FIG. 21 is a cross-sectional side view of display layers 34 that are being attached to each other with a peripheral ring of adhesive 96 (e.g., a strip of adhesive that runs along one or more of the edges of layers 34) and one or more lengths of edge member 80 (e.g., an edge member that runs along one or more of the edges of layers 34). Openings such as illustrative opening 98 may be provided in one or more of layers 34 to accommodate injection of core material 36 into the cavity formed between layers 34, as shown in FIG. 22. Core material 36 may be polymer foam, plastic resin, or other materials (e.g., honeycomb material such as honeycomb aramid, expanded foamed aluminum, or other materials).

Figure 23:
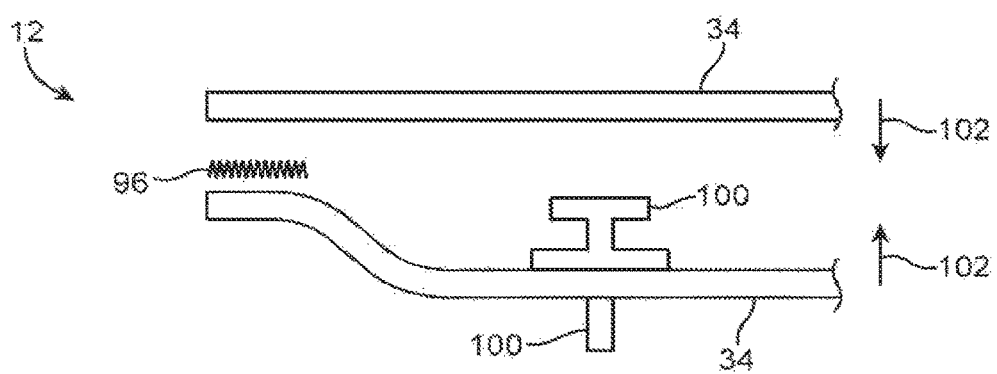
FIG. 23 is an exploded cross-sectional side view of a display having mechanical structures such as screws or other an internal features of the type that may have portions embedded within core material such as injection molded foam in accordance with an embodiment.

With a configuration of the type shown in FIGS. 21 and 22, layers 34 may be formed separately and subsequently glued together using adhesive 96. This type of approach allows potentially complicated device structures (e.g., plastic and/or metal features) to be incorporated into device housing 12. As shown in FIG. 23, for example, mechanical structure 100 (e.g., a screw, screw boss, other mechanical fasteners, mounting bracket, or other structure) may have portions on the inside and on the outside of the cavity formed between respective display housing layers 34. Layers 34 may be formed separately. An opening may be drilled in one (or both) of layers 34 to accommodate attachment of structure 100. Structure 100 can then be attached in the opening (e.g., a nut may be screwed onto a threaded shaft in structure 100). Adhesive 96 can be compressed between layers 34 by joining layers 34 in directions 102. By filling the interior of display structures 12 between layers 34 with foam 36, structures 100 may be at least partly embedded within foam 36. In this way, structures 100 may be captured by and thereby secured by the foam to enhance strength and electrical insulation.

Figure 24:
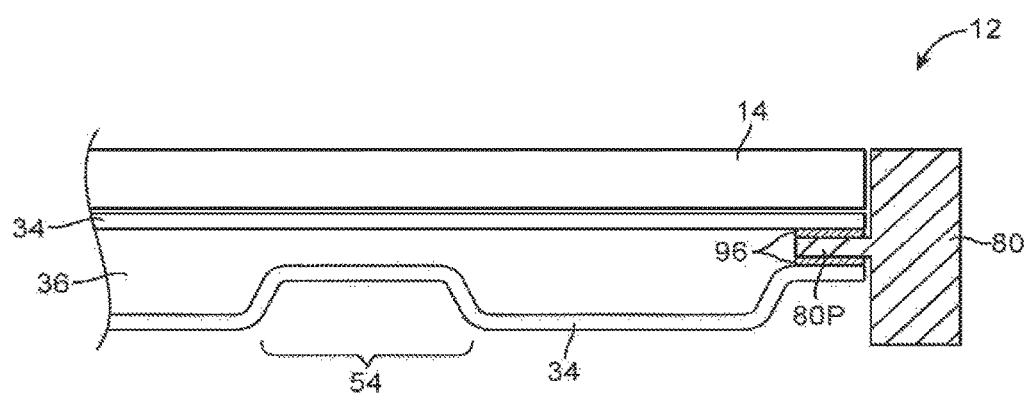
FIG. 24 is a cross-sectional side view of a display housing in which a display has been mounted in accordance with an embodiment.

FIG. 24 is a cross-sectional side view of display housing 12 in a configuration in which display 14 has been mounted to one of layers 34. Layers 34 may, as an example, include a planar layer (the uppermost layer in the orientation of FIG. 24) and a layer with an array of recesses 54. Recesses 54, which may sometimes be referred to as depressions, indentations, recesses, protrusions, dimples, cavities, etc. may be provided in a two dimensional array that covers the lowermost layer of housing 12 (in the orientation of FIG. 24). Edge member 80 may be attached between layers 34 using adhesive 96. Core 36 (e.g., foam) may be sandwiched between layers 34. Adhesive or other attachment mechanisms may be used to secure the structures of display 14 within display housing 12. For example, adhesive may be interposed between display 14 and the adjacent layer 34 in display housing 12.

Figure 25:
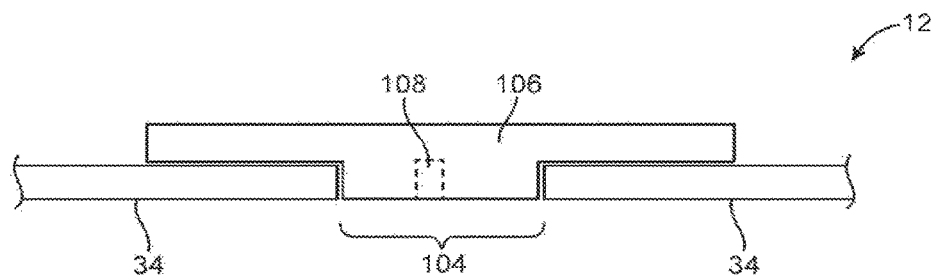
FIG. 25 is a cross-sectional side view of a portion of a display housing wall in which a screw boss has been mounted within an opening in the display housing wall in accordance with an embodiment.

As shown in FIG. 25, layers 34 may have openings such as opening 104. Components such as screw boss structure 106 may be mounted in openings such as opening 104 (e.g., using adhesive). Screw boss 106 may include threaded opening 108 to receive a threaded screw.

Figure 26:
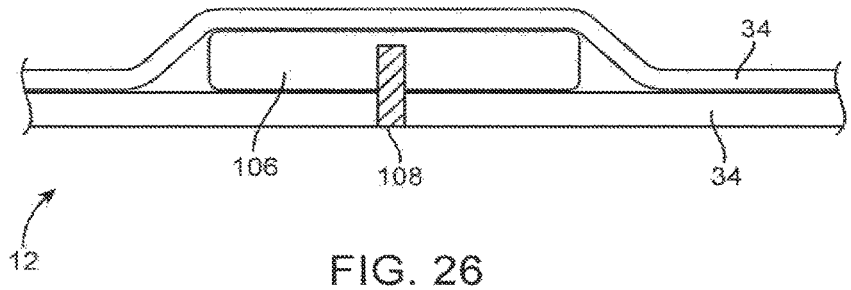
FIG. 26 is a cross-sectional side view of a portion of a display housing in which a screw boss has been formed by drilling through a layer in the display housing in accordance with an embodiment.

In the example of FIG. 26, a screw boss has been formed by sandwiching screw boss member 106 between layers 34. In this type of configuration, a drill may be used to drill directly through one of layers 34 when forming threaded screw hole 108. Screw boss structures such as structures 106 of FIG. 26 may be formed from metal, plastic, or other material.

Figure 27:
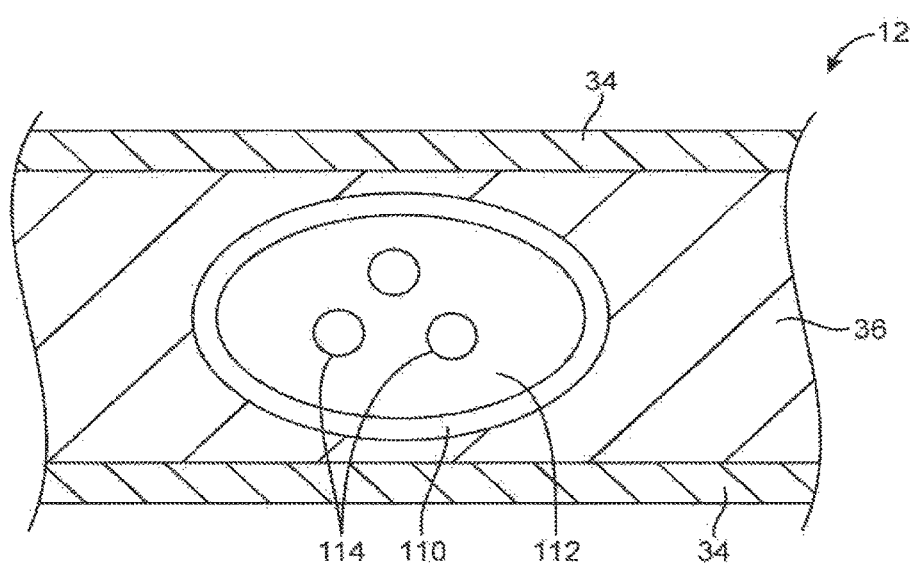
FIG. 27 is a cross-sectional side view of an illustrative display housing having a core material such as injection molded foam that is surrounding a buried channel such as a cable conduit or other hollow tube embedded in the foam in accordance with an embodiment.

If desired, hollow tubes and other conduit structures may be embedded within core 36 between layers 34. As shown in FIG. 27, for example, one or more tubes such as hollow tube 110 may be embedded within core 36 between respective display housing layers 34. Interior portion 112 of tube 110 may be filled with air. This allows structures such as wires 114 or other electronic components and structures in device 10 to be routed through interior portion 112. Wires 114 may carry power, analog data signals, digital data signals, optical signals (e.g., when cables 114 are formed from optical fiber), etc. If desired, wires 114 may be directly embedded within core material such as foam 36.

Figure 28:
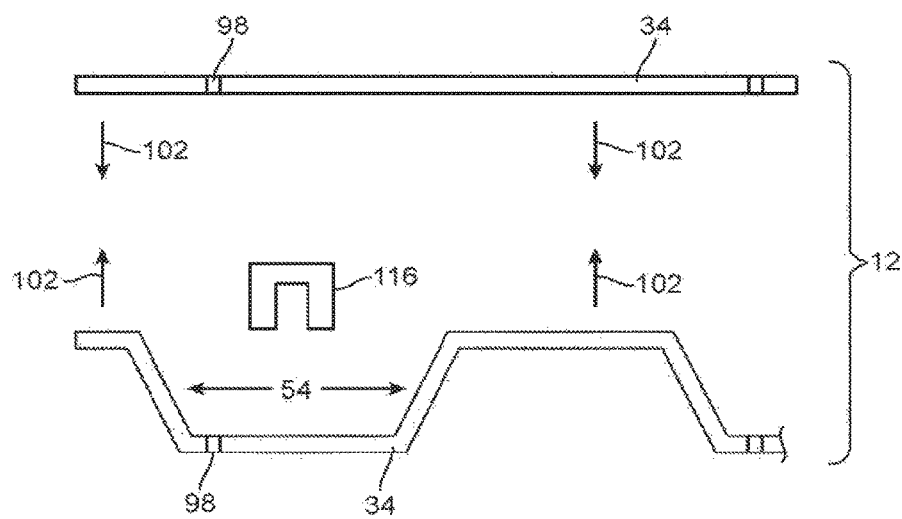
FIG. 28 is an exploded side view of layers in a display housing that are being used to enclose an electrical component or other device structure in accordance with an embodiment.

FIG. 28 is an exploded side view of layers 34 in display housing 12 that are being used to enclose illustrative structure 116. Structure 116 may be hollow tubing, an electrical component, a housing structure, a screw boss structure, wires, or other device structure.

Figure 29:
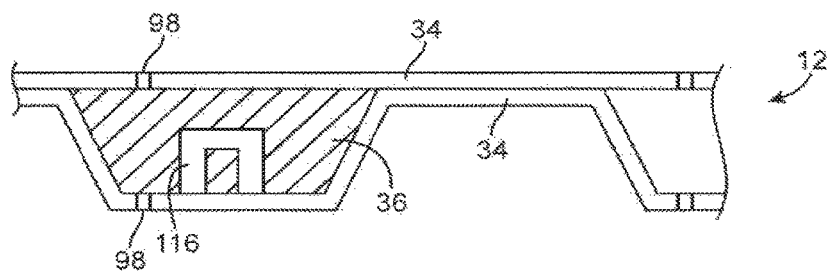
FIG. 29 is a cross-sectional side view of a display housing having an embedded electrical component or other device structure in accordance with an embodiment.

After sandwiching together display housing layers 34 and injecting foam 36 into the cavities formed between display housing layers 34 (e.g., cavities formed by depressions 54), display housing layers 12 of FIG. 28 may appear as shown in FIG. 29.

Figure 30:
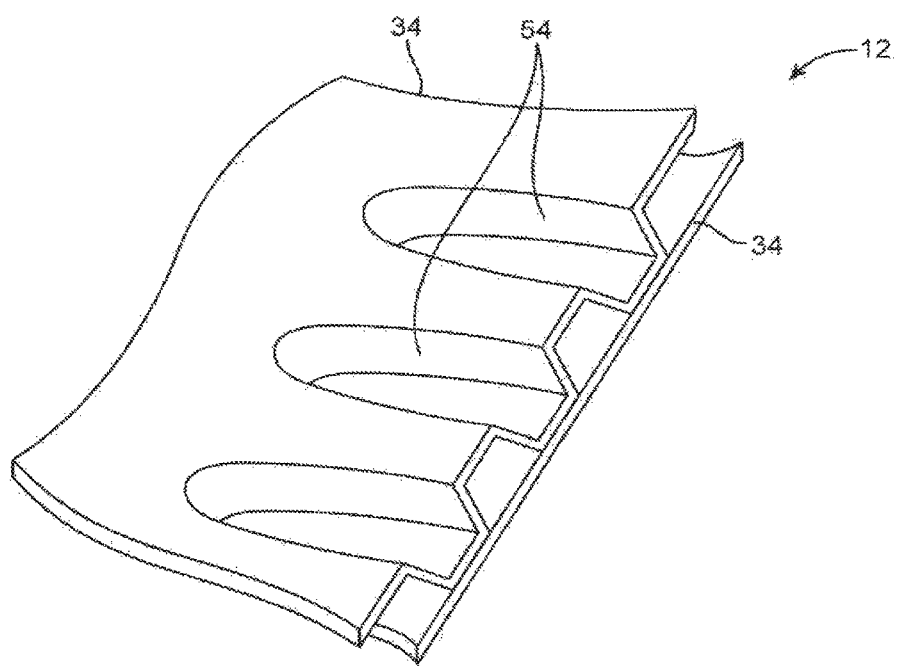
FIG. 30 is a perspective view of a display housing structure in accordance with an embodiment.

FIG. 30 is a cross-sectional perspective view of display housing 12 taken along a line that bisects a plurality of depressions 54 in one of display housing layers 34. Adhesive, fasteners, or other attachment mechanisms may be used in attaching layers 34 together. Depressions 54 may form a two-dimensional array having a plurality of rows and columns. The presence of depressions in a display layer stiffens the layer and thereby helps stiffen display housing 12.

Figure 31:
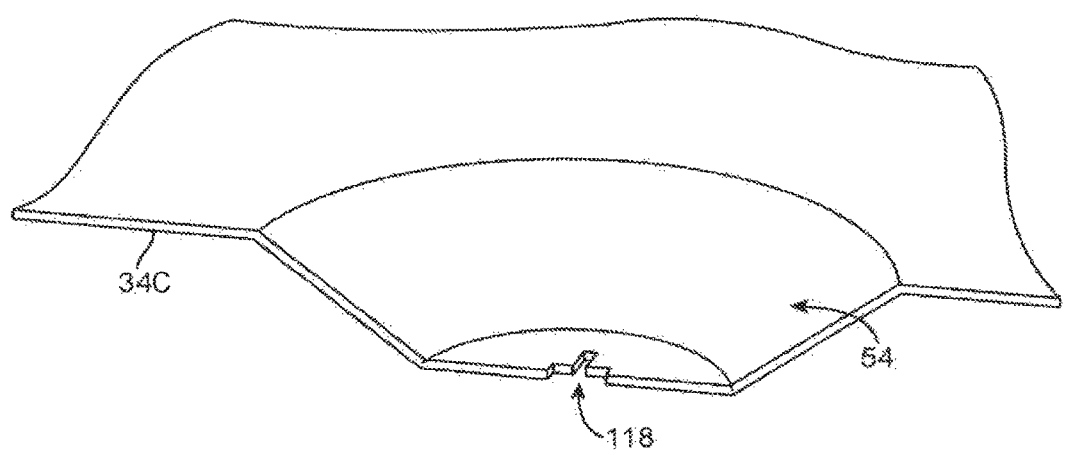
FIG. 31 is a cross-sectional perspective view of a portion of a molded depression in a display housing layer in accordance with an embodiment.

FIG. 31 is a cross-sectional perspective view of a portion of depression 54 showing how cross-shaped cuts 118 or other openings may be formed in each depression 54 to prevent damage to layer 34 in a scenario in which layer 34 is formed from a fiber composite that is resistant to stretching (e.g., carbon fiber composite). Cuts 118 may help depressions 54 to be successfully formed (i.e., cuts 118 may help accommodate stretching in the material in depressions 54) while molding composite layers 34C to form display housing 12.

Figure 32:
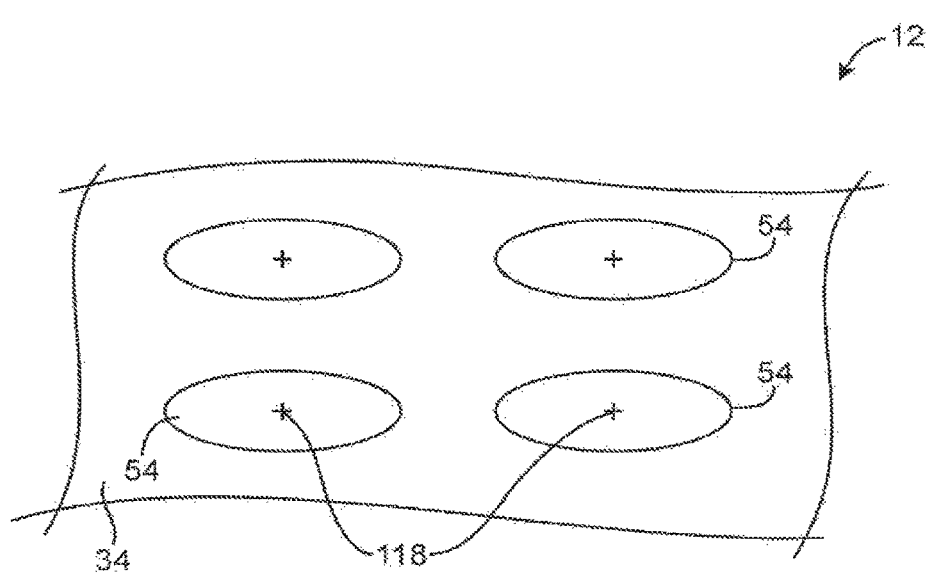
FIG. 32 is a top view of an illustrative display housing layer illustrating how an array of depressions may be formed within the display housing layer in accordance with an embodiment.

FIG. 32 shows how display housing 12 may have a plurality of depressions 54 arranged in an array. Depressions 54 may have circular footprints (i.e., circular shapes when viewed from above), may have oval shapes, may have rectangular or square shapes, or may have other shapes with curved and/or straight edges. The example of FIG. 32 in which depressions 54 have oval footprints is merely illustrative.

Figure 33:
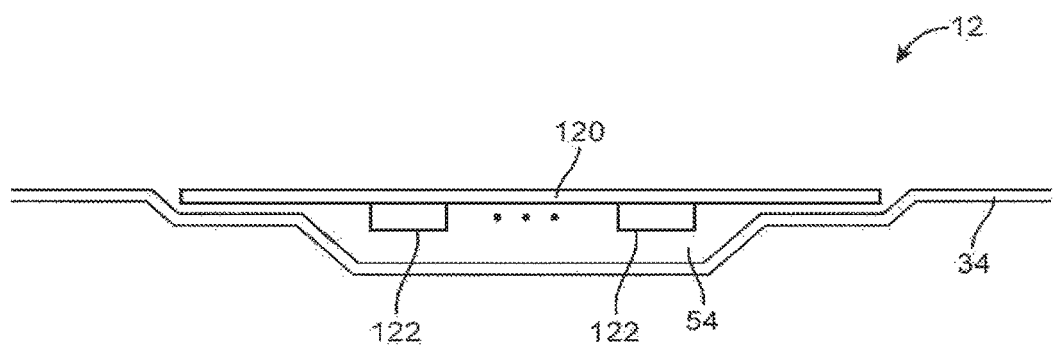
FIG. 33 is a cross-sectional side view of display housing structures in which a cap structure has been mounted in a depression in a display housing wall in accordance with an embodiment.

FIG. 33 is a cross-sectional side view of display housing 12 in a configuration in which a cap structure has been mounted in depression 54. In particular printed circuit board 120 or a layer of metal or plastic may be used in forming the cap structure. Components 122 may be mounted on printed circuit board 120 so that components 122 are mounted within the available space provided by depression 54 in display housing layer 34. Air may be used to cool components 122 during operation.

Figure 34:
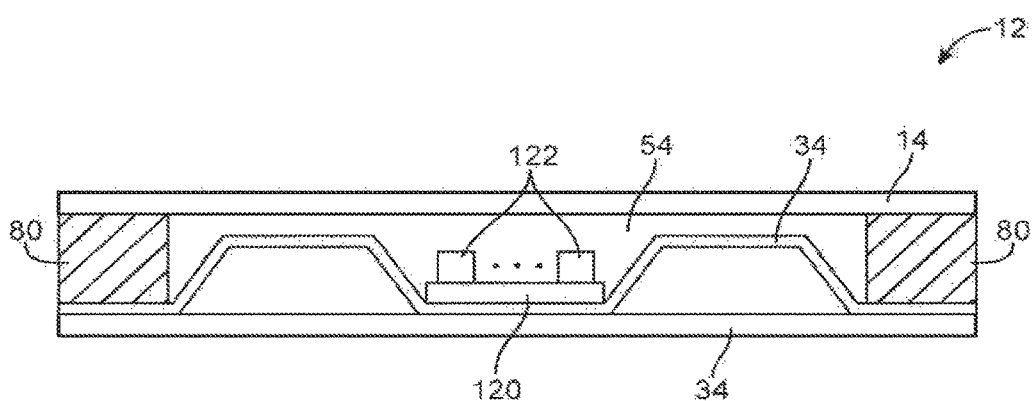
FIG. 34 is a cross-sectional side view of display housing structures of the type that may be provided with internal cavities for mounting electronic components on printed circuit boards in accordance with an embodiment.

As shown by the cross-sectional side view of FIG. 34, components 122 may protrude towards display 14. Display 14 may be mounted adjacent to a display layer with depressions 54 for accommodating printed circuit board 120 and components 122. Edge members 80 may be attached to the edges of display housing structures 12 between display 14 and an adjacent one of layers 34. In this configuration, one of layers 34 (i.e., the layer 34 with depressions 54) is interposed between the other of layers 34 (e.g., the planar layer) and display 14. Configurations in which display 14 is mounted adjacent to a planar display housing layer (also referred to herein as a planar metal layer, a planar metal display housing layer, a planar layer, and a planar composite layer) and in which the planar display housing layer is interposed between display 14 and the display housing layer with depressions 54 may also be used.

Figure 35:
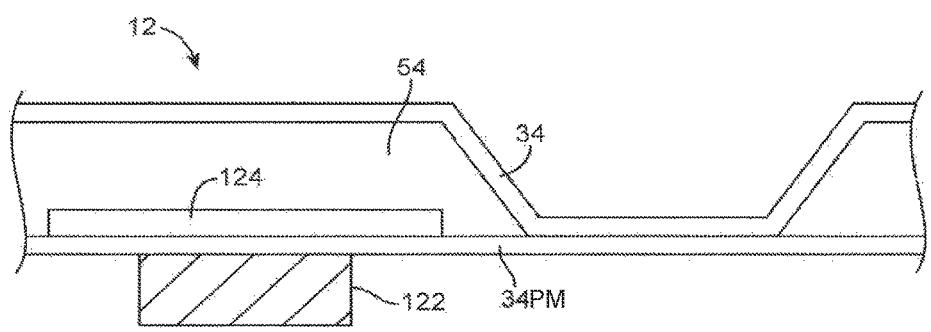
FIG. 35 is a cross-sectional side view of illustrative display housing structures having a component that dissipates heat through a thermal spreader in accordance with an embodiment.

Some components 122 may generate heat. Heat that is produced during operation may be dissipated through layers 34. For example, layers 34 include a metal layer such as an aluminum layer and components 122 may dissipate heat through the metal layer. In the example of FIG. 35, component 122 has been mounted to a planar metal layer 34PM that is in turn attached to a display housing layer 34 with depressions 54. Heat spreader 124 has been mounted in one of depressions 54 to help dissipate heat generated from component 122. The metal layer 34PM on which spreader 124 is mounted has opposing first and second surfaces. Spreader 124 is mounted on the first surface and component 122 is mounted on the opposing second surface. Because heat spreader 124 has been mounted in a cavity formed by one of depressions 54, heat spreader 124 can be incorporated into display housing 12 without making display housing 12 too bulky. Heat spreader 124 may be formed from metal, may be a graphite heat spreader, may be a graphene heat spreader, or may be formed form other heat sink materials.

Figure 36:
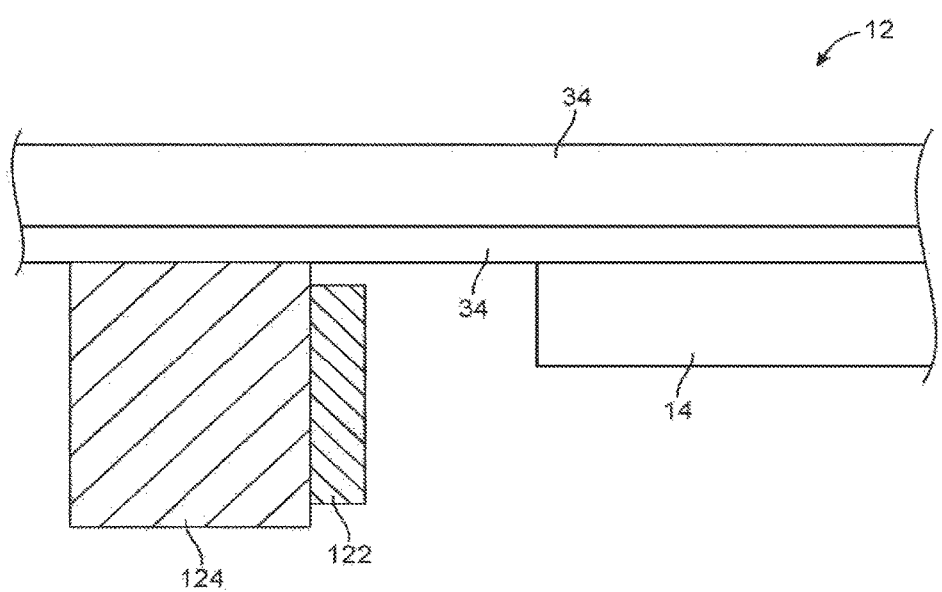
FIG. 36 is a cross-sectional side view of an illustrative display housing that has been provided with a component such as a light-emitting diode that generates heat in accordance with an embodiment.

In the example of FIG. 36, heat spreader 124 is mounted on the same side of display housing layer 34 as component 122. Heat spreader 124 may be, for example, a graphite heat spreader, a graphene heat spreader, or a metal heat spreader such as a heat spreader formed from aluminum. The lower layer 34 in FIG. 36 may be a planar metal layer such as a layer of aluminum. The upper layer 34 in FIG. 36 may be a composite layer (also referred to herein as a fiber composite layer and a fiber composite display housing layer) such as a layer of carbon fiber material. Display 14 may be a liquid crystal display (e.g., a display in which component 122 is a light-emitting diode that generates backlight for a backlight unit associated with display 14), an organic light-emitting diode display, or other display.

Figure 37:
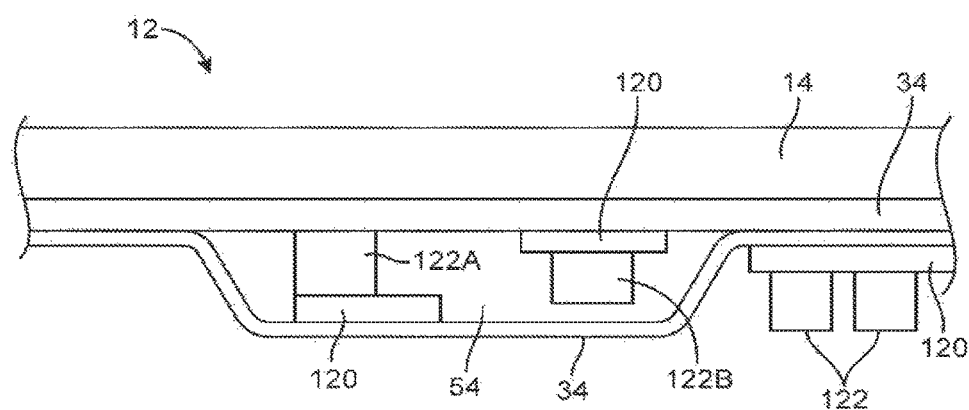
FIG. 37 is a cross-sectional side view of an illustrative display housing in which internally mounted components dissipate heat through layers in the display housing in accordance with an embodiment.

FIG. 37 is a cross-sectional side view of an illustrative configuration for display housing 12 in which components 122 have been mounted on printed circuit boards 120. Lower display housing layer 34 may be a layer of carbon fiber material or other fiber composite material with an array of depressions 54. Printed circuit boards 120 and components 122 may be mounted on one or both sides of the lower display housing layer 34. Upper display housing layer 34 may be a layer of metal such as a layer of aluminum suitable for dissipating heat that is generated by components in device 10. As shown in FIG. 37, component 122A has been mounted so as to contact (directly or through thermal grease) upper display housing layer 34 (i.e., the display housing layer 34 that is adjacent to display 14). This help transfer heat from component 122A to layer 34 during operation to cool component 122A. Component 122B may likewise dissipate heat into upper (metal) layer 34 via printed circuit board 120, which is mounted in contact with upper layer 34.

Figure 38:
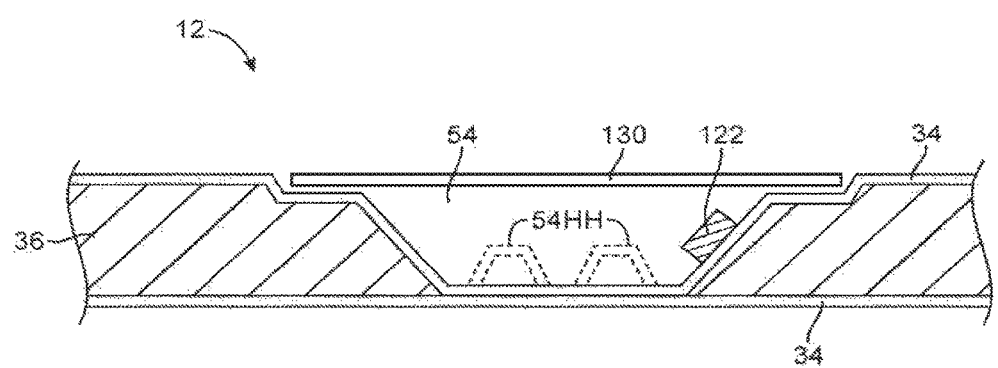
FIG. 38 is a cross-sectional side view of a depression in a display housing of the type that may be provided with internal components and half-height depression features in accordance with an embodiment.

Recesses such as depressions 54 in display layers 34 may be used to form air filled cavities. In the example of FIG. 38, the uppermost display layer 34 (in the orientation of FIG. 38) is formed from a fiber composite material and has depression 54. The lowermost display layer 34 is formed from metal or other material. Optional half-height (non-full-height) depressions 54HH may be formed in within depression 54 in uppermost display layer 34 to help strengthen this layer within recess 54. Air may fill the cavity formed between cap 130 and the portions of uppermost display layer 34 adjacent to depression 54. Component 122 may be mounted in the cavity. The air of the cavity may cool component 122. If desired, component 122 may be a speaker (i.e., a speaker driver) that uses the cavity formed from depression 54 as a speaker box.

Figure 39:
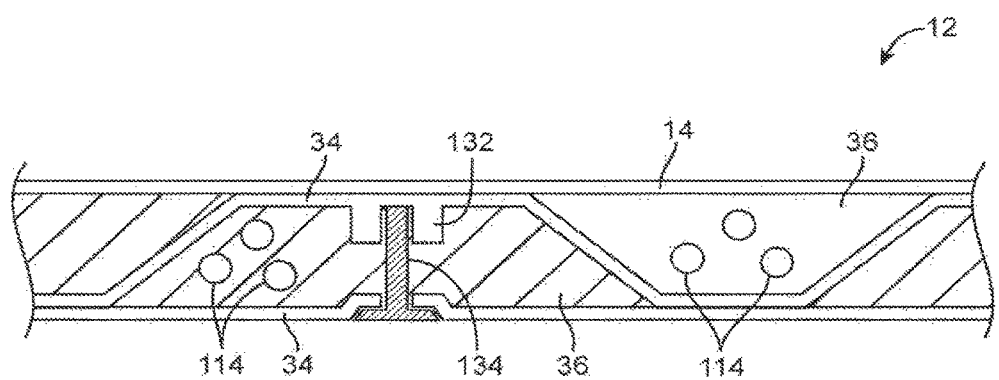
FIG. 39 is a cross-sectional side view of a display housing having internal cavities for accommodating cables and other structures in accordance with an embodiment.

FIG. 39 shows how a screw boss such as screw boss 132 may be formed as an integral portion of one of display housing walls 34 (i.e., the uppermost wall 34 in the orientation of FIG. 39). A metal insert may be incorporated into the screw boss structure if desired. Display 14 may be mounted adjacent to uppermost wall 34. Wires 114 or other components may be embedded within foam core 36. If desired, wires 114 may be routed through embedded hollow tubes. Screw 134 may have a threaded shaft that is received within mating threads in screw boss 132 of uppermost wall 34.

Figure 40:
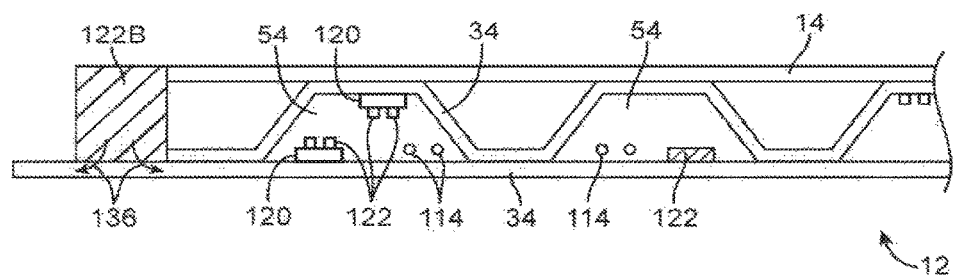
FIG. 40 is a cross-sectional side view of an illustrative display housing with a heat producing component that dissipates heat through a planar layer in the display housing and that has internal cavities in which electrical components are mounted in accordance with an embodiment.

FIG. 40 is a cross-sectional side view of illustrative display housing 12 in a configuration in which heat producing components 122 are mounted within recesses 54. Display housing 12 may include uppermost display housing layer 34 and lowermost display housing layer 34 (in the orientation of FIG. 40). The lowermost display housing layer 34 may be a layer of metal such as a layer of aluminum that helps dissipate heat from components. The lowermost display housing layer 34 of display housing 12 of FIG. 40 may, for example, dissipate heat 136 from component 122B (e.g., a light-emitting diode for a liquid crystal display such as display 14). The uppermost display housing layer 34 may be a fiber composite layer that has depressions 54 and that is interposed between lowermost display housing layer 34 and display 14.

Figure 41:
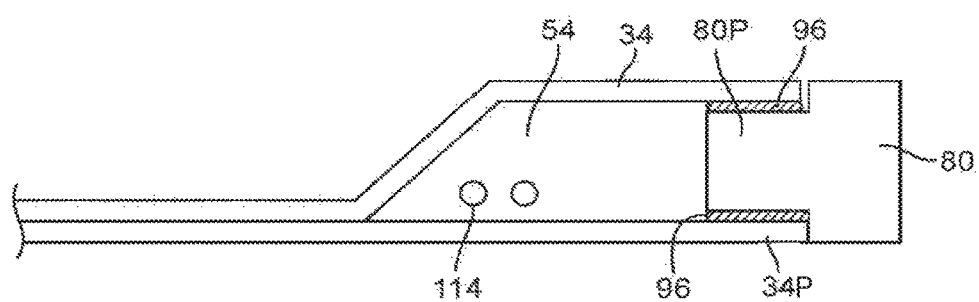
FIG. 41 is a cross-sectional side view of an edge portion of a display housing having a peripheral wall member that is inserted into a peripheral gap between layers in the display housing in accordance with an embodiment.

FIG. 41 is a cross-sectional side view of an edge portion of display housing 12 in a configuration in which a depression 54 forms a cavity adjacent to edge member 80. Edge member 80 may have an inwardly protruding portion such as protrusion 80P that is attached between opposing display housing layers 34 using adhesive 96. The cavity formed from depression 54 may contain components and device structures. For example, wires 114 may be routed within the cavity. The display housing layer 34 that includes depressions 54 (i.e., uppermost layer 34 in FIG. 41) may be formed from carbon fiber material or other fiber composite material and the planar display housing layer 34P (i.e., lowermost layer 34 in FIG. 41) may be formed from a metal such as aluminum).

Figure 42:
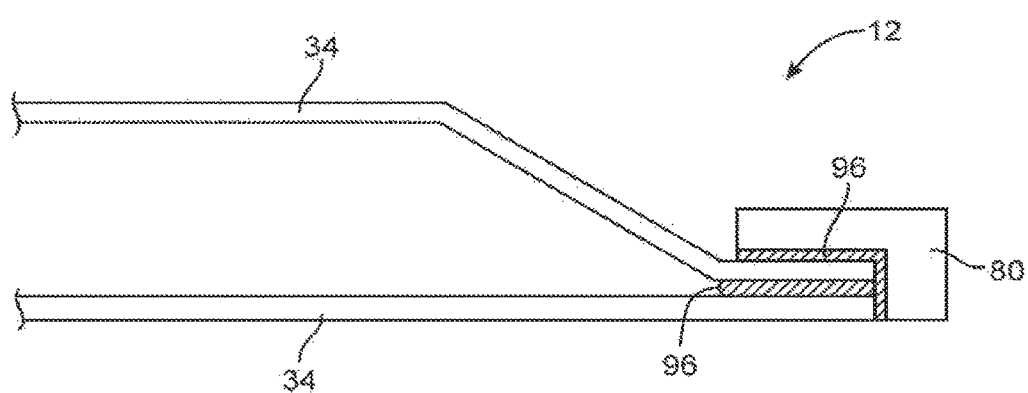
FIG. 42 is a cross-sectional side view of an edge portion of a display housing having a peripheral wall member with an L-shaped cross section in accordance with an embodiment.

If desired, edge member 80 may have an L-shaped cross-sectional shape. This type of arrangement is shown in FIG. 42. Layers 34 may be attached to each other using adhesive 96. Adhesive 96 may also be used in attaching L-shaped edge member 80 to the peripheral edge of display housing 12.

Figure 43:
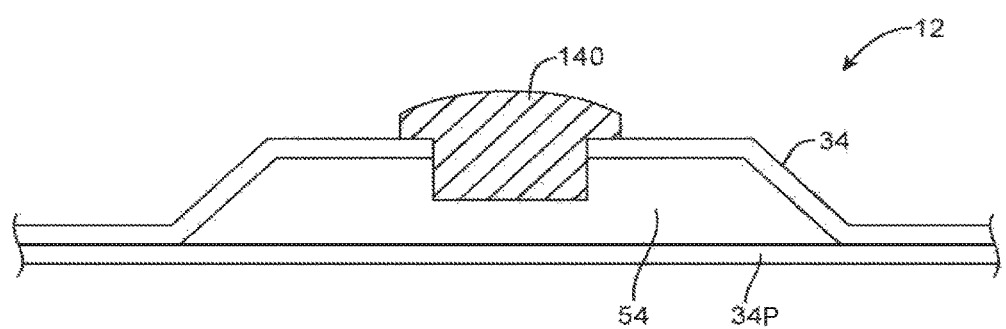
FIG. 43 is a cross-sectional side view of an illustrative display housing having a speaker or other component mounted in a display housing wall so that the speaker can use an internal air cavity formed between display housing walls in accordance with an embodiment.

FIG. 43 is a cross-sectional side view of an illustrative configuration for display housing 12 in which speaker driver 140 is mounted in an opening in one of display housing layers 34 (e.g., a fiber composite layer with a depression 54 that forms an air-filled cavity). The cavity formed by depression 54 and the portion of the planar display housing layer 34P that covers depression 54 may be used as a speaker box (speaker cavity) for a speaker that is formed from speaker driver 140.

Figure 44:
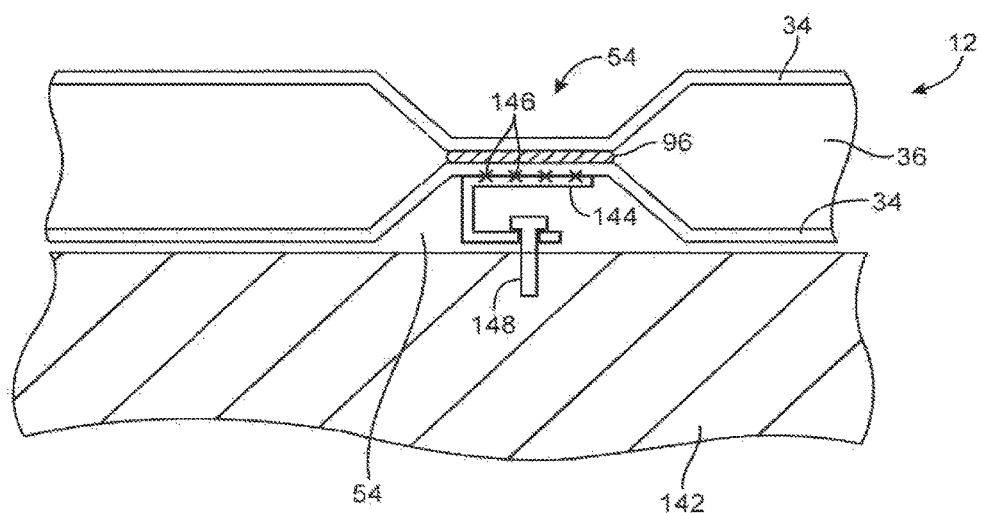
FIG. 44 is a cross-sectional side view of an illustrative display housing having a wall mounting bracket attached to the display housing in accordance with an embodiment.

FIG. 44 is a cross-sectional side view of an illustrative configuration for display housing 12 in which each display housing wall has depressions 54. Depressions 54 may be attached to each other using adhesive 96 (as an example). If desired, one of display housing layers 34 may be formed from a planar metal layer and one of display housing layers 34 may be formed from a fiber composite layer with an array of depressions 54. The configuration of FIG. 44 in which both layers 34 have an array of depressions 54 (e.g., in which both of display housing layers 34 are fiber composite layers) is merely illustrative.

Foam 36 may fill the gaps formed between display housing walls 34. Mounting bracket 144 may be formed from a material such as plastic, metal, or fiber composite material. Mounting structures such as illustrative bracket 144 may be separate from layers 34 or may be formed as integral portions of a display housing layer. Connections 146 such as adhesive, welds, solder, or fasteners may be used in attaching mounting bracket structure 144 to display housing layers 34. Screw 148 may be used to attach mounting bracket 144 and therefore display housing 12 to wall 142 (e.g., by mating with hardware that has already been screwed into wall 142).

Figure 45:
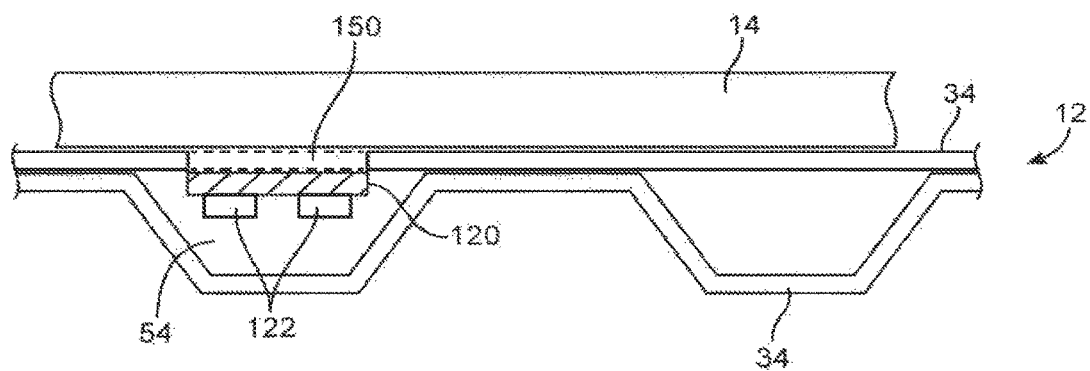
FIG. 45 is a cross-sectional side view of an illustrative display housing in which a display has been mounted so that circuits mounted on a substrate can be coupled to the display through an opening in a layer of the display housing in accordance with an embodiment.

FIG. 45 is a cross-sectional side view of an illustrative configuration for display housing 12 in which display 14 has been mounted so that circuits 122 that have been mounted on printed circuit substrate 120 can be electrically coupled to display 14 through an opening such as opening 150 in one of display housing layers 34. Components 122 may be mounted in a cavity formed from depression 54.

Figure 46:
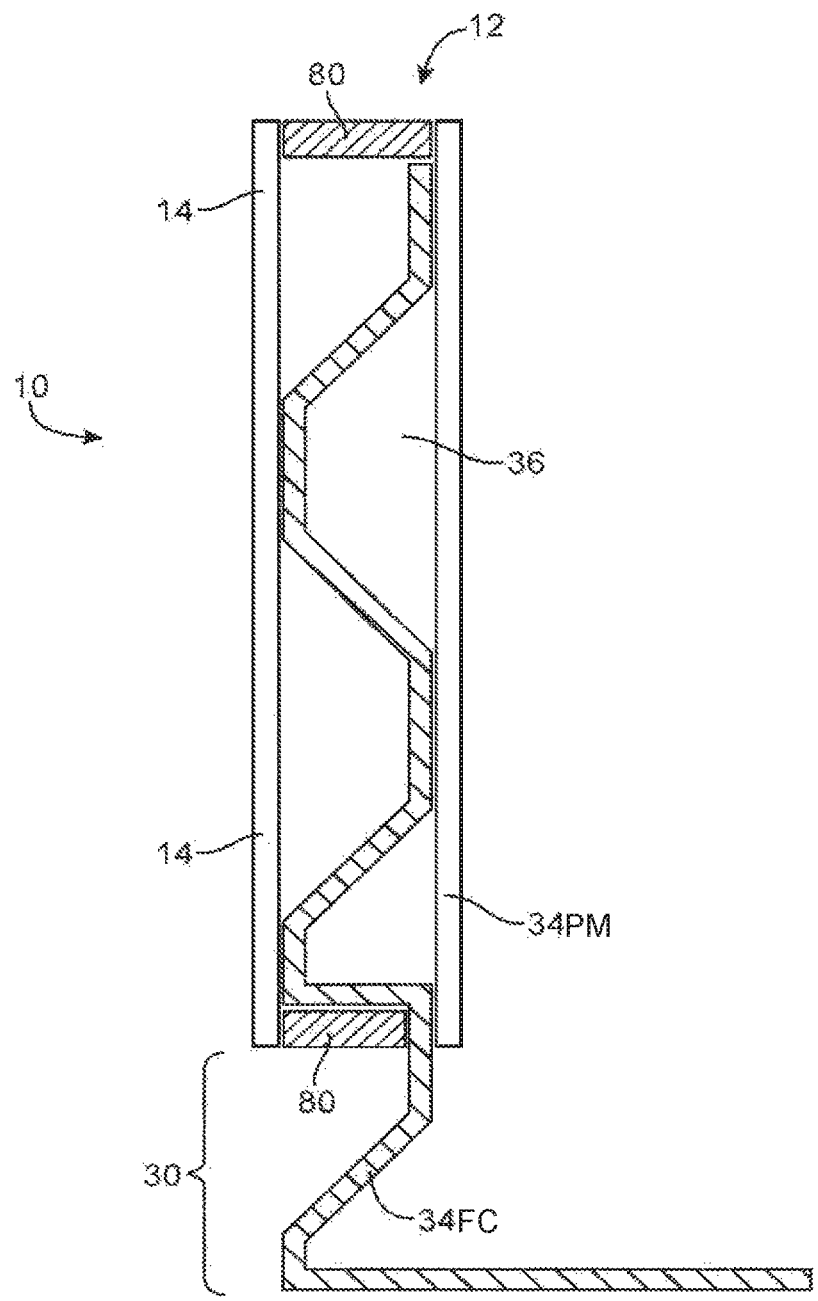
FIG. 46 is a cross-sectional side view of an illustrative electronic device having a display housing with an integral stand in accordance with an embodiment.

Display housing layers can be used in forming a stand or other support for device 10. This type of configuration is shown in FIG. 46. In the example of FIG. 46, display housing 12 has rear planar metal display housing layer 34PM and front (inner) fiber composite display housing layer 34FC. Foam may be interposed between layers 34PM and 34FC. Edge member 80 may run along the edges of housing 12. One of layers 34PM and 34FC such as the fiber composite display housing layer 34FC may extend downwards to form an integral stand such as stand 30. If desired, part of a stand may be formed in this way. Stand 30 may also be formed from separate structures that are attached to layers 34PM and 34FC using fasteners or other attachment mechanisms.

Figure 47:
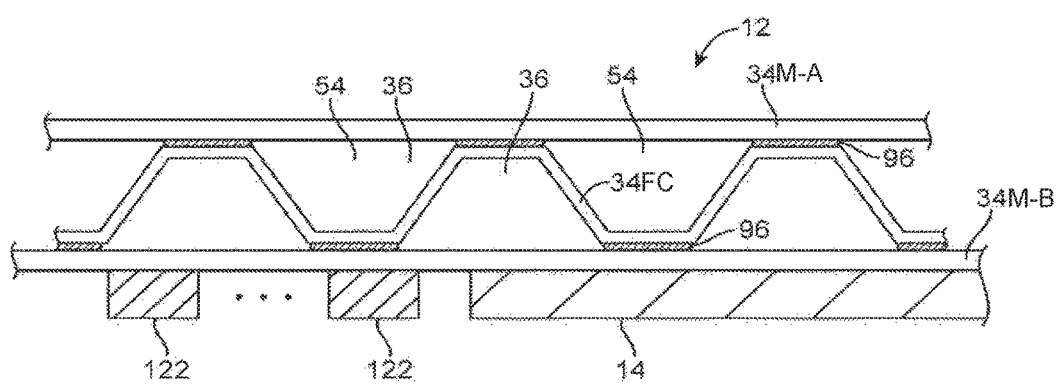
FIG. 47 is a cross-sectional side view of an illustrative display housing having components and a display mounted on an outer surface of the display housing in accordance with an embodiment.

Display housing 12 may have three or more display housing layers 34. In the example of FIG. 47, display housing 12 has three display housing layers 34. The uppermost layer 34M-A and the lowermost layer 34M-B (in the orientation of FIG. 47) may be, for example, metal layers. The inner layer 34FC may be a fiber composite layer with an array of depressions 54. Adhesive 96 may be used to attach layers 34 together. Display 14 may be mounted on one of the planar metal layers 34M to facilitate heat dissipation. Components 122 may likewise be mounted on one of the planar metal layers 34M to help dissipate heat.

Figure 48:
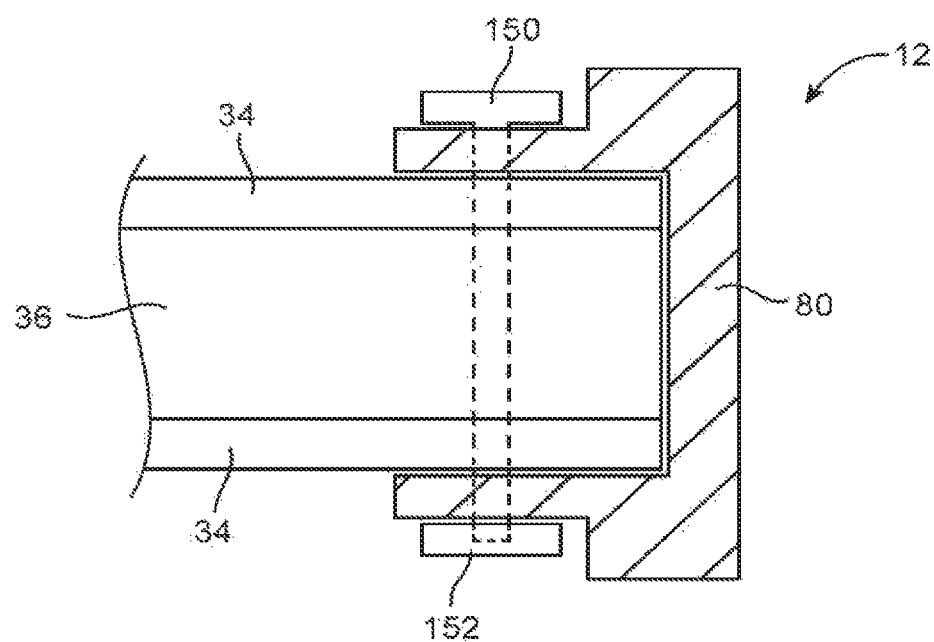
FIG. 48 is a cross-sectional side view of an edge portion of an illustrative display housing in which a peripheral member has been attached to the display housing using a fastener in accordance with an embodiment.

FIG. 48 is a cross-sectional side view of an edge portion of an illustrative display housing to which a peripheral member 80 such as a metal band, plastic band, or other peripheral wall structure has been attached. As shown in FIG. 48, fasteners such as screw (bolt) 150 and nut 152 may be used in attaching peripheral member 80. In general, any suitable combination of fasteners (rivets, heat stakes, screws, bolts and nuts, etc.), adhesive, interlocking engagement features (e.g., clips and mating holes, etc.), or other fastening mechanisms may be used in attaching peripheral structures to the edge of display housing 12. The example of FIG. 48 is merely illustrative.

Figure 49:
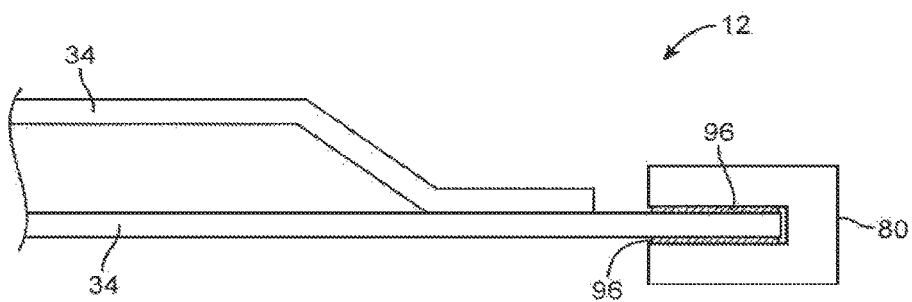
FIG. 49 is a cross-sectional side view of an edge portion of an illustrative display housing in which a peripheral member has been attached to a planar display housing layer in accordance with an embodiment.

FIG. 49 is a cross-sectional side view of an edge portion of an illustrative display housing in which a peripheral member has been attached to a planar display housing layer (e.g., the lowermost layer 34 in the orientation of FIG. 49) using adhesive 96. The planar display housing layer may be attached to a display housing layer with depressions using adhesive, fasteners, etc. The display housing layers may be formed from fiber composite material, from metal, from plastic, or other materials. For example, the layer with depressions may be fiber composite or metal or plastic and the planar layer may be fiber composite, metal, or plastic.

Figure 50:
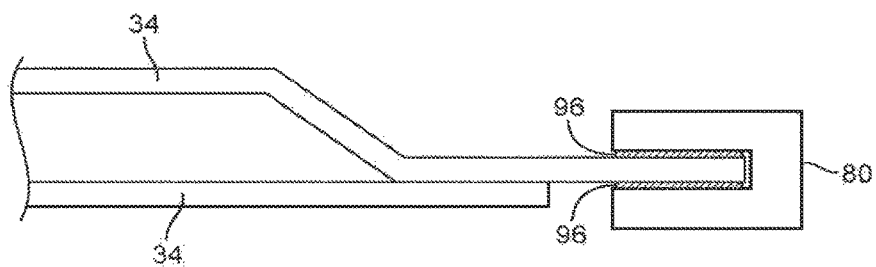
FIG. 50 is a cross-sectional side view of an edge portion of an illustrative display housing in which a peripheral member has been attached to a display housing layer with an array of depressions in accordance with an embodiment.

FIG. 50 is a cross-sectional side view of an edge portion of an illustrative display housing in which a peripheral member has been attached to a display housing layer with an array of depressions (e.g., the lowermost layer 34 in the orientation of FIG. 50) using adhesive 96. A planar display housing layer and the layer with depressions may be attached to each other with adhesive, fasteners, etc. Display housing layers 34 may be formed from fiber composite material, from metal, from plastic, or other materials. For example, the layer with depressions may be fiber composite or metal or plastic and the planar layer may be fiber composite, metal, or plastic.

Figure 51:
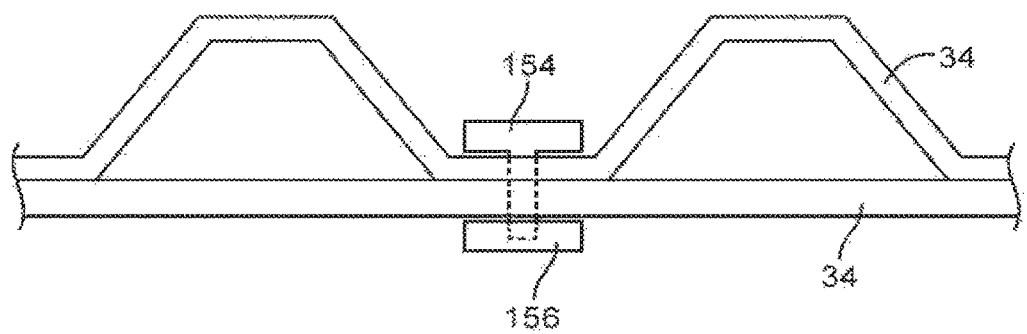
FIG. 51 is a cross-sectional side view of an illustrative display housing in which a member with an array of depressions and a layer of material without depressions have been attached to each other using fasteners in accordance with an embodiment.

FIG. 51 is a cross-sectional side view of an illustrative display housing in which a display housing layer with an array of depressions and a display housing layer without depressions have been attached to each other using fasteners such as screw (bolt) 154 and nut 156. If desired, other fastening techniques may be used to attach display layers 34 together such as combinations of fasteners (rivets, heat stakes, screws, bolts and nuts, etc.), adhesive, interlocking engagement features (e.g., clips and mating holes, etc.), or other fastening mechanisms. The example of FIG. 51 is merely illustrative.

The foregoing is merely illustrative and various modifications can be made by those skilled in the art without departing from the scope and spirit of the described embodiments. The foregoing embodiments may be implemented individually or in any combination.

What is claimed is:

1. Apparatus, comprising:
   a display;
   a display housing in which the display is mounted, wherein the display housing includes a fiber composite display housing layer with an array of depressions and a planar display housing layer that is attached to the fiber composite display housing layer; and
   a speaker driver that passes through an opening in the fiber composite display housing layer.

2. The apparatus defined in claim 1 wherein the planar display housing layer comprises a planar fiber composite display housing layer.

3. The apparatus defined in claim 1 wherein the planar display housing layer comprises a planar metal display housing layer.

4. The apparatus defined in claim 3 further comprising an electrical component that dissipates heat through the planar metal display housing layer.

5. The apparatus defined in claim 4 wherein the electrical component comprises a light-emitting diode that generates light for the display.

6. The apparatus defined in claim 1 further comprising core material sandwiched between the fiber composite display housing layer and the planar display housing layer.

7. The apparatus defined in claim 6 wherein the core material comprises a material selected from the group consisting of: polymer, foam, a honeycomb structure, or foamed metal.

8. The apparatus defined in claim 7 further comprising wires embedded within the core material.

9. The apparatus defined in claim 7 further comprising hollow tubing embedded within the core material.

10. The apparatus defined in claim 7 wherein the planar display housing layer has an opening, wherein a component passes through the opening, and wherein at least part of the component is embedded within the core material.

11. The apparatus defined in claim 1 further comprising adhesive that attaches the fiber composite display housing layer to the planar display housing layer.

12. The apparatus defined in claim 11 further comprising a plurality of openings in the planar display housing layer.

13. The apparatus defined in claim 12 wherein the planar display housing layer comprises a planar metal layer and wherein the plurality of openings comprises an array of openings that lighten the planar metal layer.

14. The apparatus defined in claim 1 wherein the display housing has peripheral edges, the apparatus further comprising an edge member that runs along at least one of the peripheral edges.

15. The apparatus defined in claim 14 wherein the edge member comprises a metal band having a protrusion that is sandwiched between the fiber composite display housing layer and the planar display housing layer.

16. The apparatus defined in claim 14 wherein the edge member is attached to the fiber composite display housing layer.

17. The apparatus defined in claim 14 wherein the edge member is attached to the planar display housing layer.

18. The apparatus defined in claim 14 wherein the edge member is attached to the display housing with fasteners.

19. The apparatus defined in claim 14 wherein the edge member is attached to the display housing with adhesive.

20. The apparatus defined in claim 1 wherein the planar display housing layer is attached to the fiber composite display housing layer with fasteners.

21. An electronic device, comprising:
a display;
a housing in which the display is mounted, wherein the housing includes a fiber composite layer and a metal layer, wherein the fiber composite layer includes an array of depressions, and wherein adhesive attaches the fiber composite layer to the metal layer;
a printed circuit board mounted between the display and the fiber composite layer; and
an electrical component mounted on the printed circuit board.

22. The electronic device defined in claim 21 wherein the metal layer comprises a planar metal layer.

23. The electronic device defined in claim 21 further comprising a cut in each depression.

24. The electronic device defined in claim 21 further comprising:
an additional electrical component on a first surface of the metal layer; and
a heat spreader on an opposing surface of the metal layer that dissipates heat from the additional electrical component.

25. An electronic device, comprising:
a display;
a housing in which the display is mounted, wherein the housing includes a fiber composite layer and a metal layer, wherein the fiber composite layer includes an array of depressions, and wherein adhesive attaches the fiber composite layer to the metal layer;
a printed circuit board mounted between the fiber composite layer and the metal layer; and
an electrical component mounted on the printed circuit board.

26. The electronic device defined in claim 21 further comprising a metal member between the fiber composite layer and the metal layer.

27. The electronic device defined in claim 26 further comprising a threaded hole in the metal member.

28. A display housing, comprising:
a fiber composite layer having a plurality of fibers in a thermoplastic binder material;
a metal layer that is attached to the fiber composite layer;
a core layer that fills a gap between the fiber composite layer and the metal layer, wherein the fiber composite layer has an array of dimples; and
a mounting bracket attached to the fiber composite layer.

29. The display housing defined in claim 28 further comprising:
a printed circuit; and
an electrical component on the printed circuit, wherein the printed circuit and the electrical component are between the fiber composite layer and the metal layer and wherein the electrical component contacts the metal layer and dissipates heat into the metal layer.

30. The display housing defined in claim 29 wherein the fiber composite layer comprises a partial height depression in one of the dimples.

31. The display housing defined in claim 28 further comprising wires embedded in the core layer.

32. The display housing defined in claim 28 further comprising a screw boss formed from part of the fiber composite layer.

33. The display housing defined in claim 28 wherein the fiber composite layer has a portion that is configured to form a stand.

34. The display housing defined in claim 28 further comprising an additional metal layer, wherein the fiber composite layer is interposed between the metal layer and the additional metal layer.

35. Apparatus, comprising:
a display; and
a display housing in which the display is mounted, wherein the display housing has an array of depressions and includes fiber composite material, wherein the display housing has a first display housing layer in which the depressions are formed and has a second display housing layer that is attached to the first display housing layer, and wherein the fiber composite material has a plurality of fibers in a thermoplastic binder material.

36. The apparatus defined in claim 35 wherein the second display housing layer is formed from the fiber composite material.

37. The apparatus defined in claim 35 wherein the first display housing layer is formed from the fiber composite material.

38. The apparatus defined in claim 35 wherein the first display housing layer is formed from metal.

39. The apparatus defined in claim 35 wherein the second display housing layer is formed from metal.

* * * * *